US012748447B2

(12) United States Patent
Jeong

(10) Patent No.: US 12,748,447 B2
(45) Date of Patent: Sep. 29, 2026

(54) VOLTAGE REGULATOR AND DISPLAY DEVICE

(71) Applicant: Samsung Display Co., Ltd., Yongin-Si (KR)

(72) Inventor: Moonjae Jeong, Yongin-si (KR)

(73) Assignee: Samsung Display Co., Ltd., Gyeonggi-do (KR)

( * ) Notice: Subject to any disclaimer, the term of this patent is extended or adjusted under 35 U.S.C. 154(b) by 181 days.

(21) Appl. No.: 18/892,081

(22) Filed: Sep. 20, 2024

(65) Prior Publication Data

US 2025/0103078 A1 Mar. 27, 2025

(30) Foreign Application Priority Data

Sep. 21, 2023 (KR) ........................ 10-2023-0126305

(51) Int. Cl.
*G09G 3/32* (2016.01)
*G05F 1/575* (2006.01)
*G09G 3/3225* (2016.01)

(52) U.S. Cl.
CPC ............... *G05F 1/575* (2013.01); *G09G 3/32* (2013.01); *G09G 3/3225* (2013.01); *G09G 2300/0426* (2013.01); *G09G 2300/0819* (2013.01); *G09G 2300/0852* (2013.01); *G09G 2310/0291* (2013.01); *G09G 2320/045* (2013.01); *G09G 2330/021* (2013.01)

(58) Field of Classification Search
USPC .......................................................... 345/212
See application file for complete search history.

(56) References Cited

U.S. PATENT DOCUMENTS

| | | | | |
|---|---|---|---|---|
| 7,646,247 | B2 | 1/2010 | Dasgupta | |
| 2005/0189934 | A1 | 9/2005 | Poss | |
| 2012/0139969 | A1 * | 6/2012 | Yokoyama | G09G 3/3233 345/690 |
| 2017/0090494 | A1 | 3/2017 | Cui et al. | |
| 2017/0090496 | A1 * | 3/2017 | Kobayashi | H02H 9/001 |
| 2021/0397207 | A1 | 12/2021 | Joo et al. | |
| 2023/0025117 | A1 | 1/2023 | Kim | |

FOREIGN PATENT DOCUMENTS

KR 10-2444126 B1 9/2022

OTHER PUBLICATIONS

European Search Report corresponding to European Patent Application No. 24200386.1 dated Jan. 31, 2025, 12 pages.

(Continued)

*Primary Examiner* — Insa Sadio
(74) *Attorney, Agent, or Firm* — Innovation Counsel LLP

(57) ABSTRACT

A voltage regulator for outputting a pixel power supply voltage supplied to pixels of a display panel includes a voltage divider configured to generate a feedback voltage by dividing the pixel power supply voltage, an error amplifier configured to generate an amplifier output voltage by comparing a reference voltage and the feedback voltage, a variable phase compensating circuit configured to adjust the amplifier output voltage according to a load current, a source follower buffer configured to generate a control voltage by buffering the adjusted amplifier output voltage, and a pass transistor configured to output, as the pixel power supply voltage, an input voltage based on the control voltage.

20 Claims, 15 Drawing Sheets

(56) References Cited

OTHER PUBLICATIONS

Bhupendra K. Ahuja, "An improved frequency compensation Technique for CMOS operational amplifiers", IEEE Journal of Solid-State Circuits, vol. SC-18,No. 6, Dec. 1983, 5 pages.
Mshal Saxena and R. Jacob Baker, "Indirect feedback compensation of CMOS op-amps", 1-4244-0374-X/06/$20.00 © 2006 IEEE, 2 pages.
Uday Dasgupta, "Issues in Ahuja frequency compensation technique", 2009 IEEE International Symposium on Radio-Frequency Integration Technology, 4 pages.
Paul R. Gray and Robert G. Meyer, "MOS operational amplifier design—a tutorial overview", IEEE Journal of Solid-State Circuits, vol. SC-17, No. 6, Dec. 1982, 14 pages.

* cited by examiner

VOLTAGE REGULATOR AND DISPLAY DEVICE

CROSS-REFERENCE TO RELATED APPLICATION

This application claims priority under 35 USC § 119 to Korean Patent Application No. 10-2023-0126305, filed on Sep. 21, 2023, in the Korean Intellectual Property Office (KIPO), the content of which is herein incorporated by reference in its entirety.

BACKGROUND

Field

Embodiments disclosed herein relate to a display device, and more particularly to a voltage regulator for supplying a pixel power supply voltage to pixels of a display panel, and a display device including the voltage regulator.

Description of the Related Art

A pixel power supply voltage supplied to pixels of a display panel may need to remain at a constant voltage level even if currents drawn by the pixels change. To generate the pixel power supply voltage having the constant voltage level, a display device may include a voltage regulator, e.g., a low drop-out (LDO) regulator that regulates the pixel power supply voltage. However, if a current flowing through a line transferring the pixel power supply voltage or a load current for a voltage regulator changes, operation of the voltage regulator may become unstable, and the voltage regulator may fail to maintain the pixel power supply voltage at the constant voltage level.

SUMMARY

Some embodiments of the present disclosure provide a voltage regulator capable of stably operating throughout an entire load current range from a minimum load current to a maximum load current.

Some embodiments may provide a display device including a voltage regulator capable of stably operating throughout an entire load current range from a minimum load current to a maximum load current.

According to an embodiment, a voltage regulator may output a pixel power supply voltage, which may be supplied to pixels of a display panel. The voltage regulator includes a voltage divider configured to generate a feedback voltage by dividing the pixel power supply voltage, an error amplifier configured to generate an amplifier output voltage by comparing a reference voltage and the feedback voltage, a variable phase compensating circuit configured to adjust the amplifier output voltage according to a load current, a source follower buffer configured to generate a control voltage by buffering the adjusted amplifier output voltage, and a pass transistor configured to output, as the pixel power supply voltage, an input voltage based on the control voltage.

In an embodiment, the voltage regulator may further include at least one compensation capacitor connected between an output node at which the pixel power supply voltage is output and the error amplifier.

In an embodiment, the voltage regulator may further include an output capacitor connected between an output node at which the pixel power supply voltage is output and a line for transferring a ground voltage.

In an embodiment, the variable phase compensating circuit may include a first transistor including a gate connected to a gate of the pass transistor, a first terminal for receiving a power supply voltage, and a second terminal, a first resistor including a first terminal connected to the second terminal of the first transistor, and a second terminal, and a first capacitor including a first electrode connected to the second terminal of the first resistor, and a second electrode connected to an amplifier output node at which the amplifier output voltage is output.

In an embodiment, the source follower buffer may include a second transistor including a gate connected to an amplifier output node at which the amplifier output voltage is output, a first terminal connected to a gate of the pass transistor, and a second terminal for receiving a ground voltage, and a variable current source connected between a line for transferring a power supply voltage and the gate of the pass transistor.

In an embodiment, the source follower buffer may include a second transistor including a gate connected to an amplifier output node at which the amplifier output voltage is output, a first terminal connected to a gate of the pass transistor, and a second terminal for receiving a ground voltage, a first current source connected between a line for transferring a power supply voltage and the gate of the pass transistor, a third transistor including a gate connected to the gate of the pass transistor, a first terminal for receiving the power supply voltage, and a second terminal, a fourth transistor including a gate connected to the second terminal of the third transistor, a first terminal connected to the second terminal of the third transistor, and a second terminal for receiving the ground voltage, a fifth transistor including a gate connected to the gate of the fourth transistor, a first terminal, and a second terminal, a second resistor including a first terminal connected to the second terminal of the fifth transistor, and a second terminal for receiving the ground voltage, a sixth transistor including a gate connected to the first terminal of the fifth transistor, a first terminal for receiving the power supply voltage, and a second terminal connected to the first terminal of the fifth transistor, and a seventh transistor including a gate connected to the gate of the sixth transistor, a first terminal for receiving the power supply voltage, and a second terminal connected to the gate of the pass transistor.

In an embodiment, the voltage divider may include a third resistor including a first terminal connected to an output node at which the pixel power supply voltage is output, and a second terminal connected to a feedback node at which the feedback voltage is output, and a fourth resistor including a first terminal connected to the feedback node, and a second terminal for receiving a ground voltage.

In an embodiment, the error amplifier may include an eighth transistor including a gate for receiving the reference voltage, a first terminal, and a second terminal, a ninth transistor including a gate for receiving the feedback voltage, a first terminal, and a second terminal, a second current source connected between a line for transferring a power supply voltage and the first terminals of the eighth and ninth transistors, a tenth transistor including a gate connected to the second terminal of the eighth transistor, a first terminal connected to the second terminal of the eighth transistor, and a second terminal for receiving a ground voltage, an eleventh transistor including a gate connected to the second terminal of the ninth transistor, a first terminal connected to the second terminal of the ninth transistor, and a second terminal for receiving the ground voltage, a twelfth transistor including a gate connected to the gate of the tenth transistor, a first terminal, and a second terminal for receiving the ground voltage, a thirteenth transistor including a gate connected to the gate of the eleventh transistor, a first terminal, and a second terminal for receiving the ground voltage, a fourteenth transistor including a gate for receiving a direct current (DC) voltage, a first terminal, and a second terminal connected to the first terminal of the twelfth transistor, a fifteenth transistor including a gate for receiving the DC voltage, a first terminal connected to an amplifier output node at which the amplifier output voltage is output, and a second terminal connected to the first terminal of the thirteenth transistor, a sixteenth transistor including a gate connected to the first terminal of the fourteenth transistor, a first terminal, and a second terminal connected to the first terminal of the fourteenth transistor, a seventeenth transistor including a gate connected to the gate of the sixteenth transistor, a first terminal, and a second terminal connected to the amplifier output node, an eighteenth transistor including a gate connected to the first terminal of the sixteenth transistor, a first terminal for receiving the power supply voltage, and a second terminal connected to the first terminal of the sixteenth transistor, and a nineteenth transistor including a gate connected to the gate of the eighteenth transistor, a first terminal for receiving the power supply voltage, and a second terminal connected to the first terminal of the seventeenth transistor.

In an embodiment, the voltage regulator may further include a first compensation capacitor including a first electrode connected to an output node at which the pixel power supply voltage is output, and a second electrode connected to the second terminal of the fifteenth transistor.

In an embodiment, the voltage regulator may further include a second compensation capacitor including a first electrode connected to an output node at which the pixel power supply voltage is output, and a second electrode connected to the gates of the tenth and twelfth transistors.

In an embodiment, the voltage regulator may further include a third compensation capacitor including a first electrode connected to an output node at which the pixel power supply voltage is output, and a second electrode connected to the gate of the ninth transistor.

In an embodiment, the voltage regulator may further include a transient booster configured to adjust the pixel power supply voltage in a transient state in which the load current changes.

In an embodiment, the transient booster may include a twentieth transistor including a gate connected to a gate of the pass transistor, a first terminal for receiving a power supply voltage, and a second terminal, a third current source connected between the second terminal of the twentieth transistor and a line for transferring a ground voltage, a twenty-first transistor including a gate connected to the gate of the pass transistor, a first terminal for receiving the power supply voltage, and a second terminal, a twenty-second transistor including a gate, a first terminal connected to the second terminal of the twenty-first transistor, and a second terminal for receiving the ground voltage, a twenty-third transistor including a gate connected to the second terminal of the twenty-first transistor, a first terminal for receiving the power supply voltage, and a second terminal connected to the gate of the twenty-second transistor, a fifth resistor including a first terminal connected to the second terminal of the twenty-third transistor, and a second terminal for receiving the ground voltage, a second capacitor including a first electrode connected to the second terminal of the twentieth transistor, and a second electrode connected to the gate of the twenty-second transistor, and a twenty-fourth transistor including a gate connected to the gate of the twenty-second transistor, a first terminal connected to an output node at which the pixel power supply voltage is output, and a second terminal for receiving the ground voltage.

According to embodiments, a voltage regulator may output a pixel power supply voltage, which may be supplied to pixels of a display panel. The voltage regulator includes a voltage divider configured to generate a feedback voltage by dividing the pixel power supply voltage, an error amplifier configured to generate an amplifier output voltage by comparing a reference voltage and the feedback voltage, a first transistor including a gate connected to a gate of a pass transistor, a first terminal for receiving a power supply voltage, and a second terminal, a first resistor including a first terminal connected to the second terminal of the first transistor, and a second terminal, a first capacitor including a first electrode connected to the second terminal of the first resistor, and a second electrode connected to an amplifier output node at which the amplifier output voltage is output, a second transistor including a gate connected to the amplifier output node, a first terminal connected to the gate of the pass transistor, and a second terminal for receiving a ground voltage, a variable current source connected between a line for transferring the power supply voltage and the gate of the pass transistor, and the pass transistor including the gate connected to the gate of the first transistor and the first terminal of the second transistor, a first terminal for receiving an input voltage, and a second terminal connected to an output node at which the pixel power supply voltage is output.

In an embodiment, the voltage regulator may further include at least one compensation capacitor connected between the output node and the error amplifier.

In an embodiment, the voltage regulator may further include an output capacitor connected between the output node and a line for transferring the ground voltage.

According to an embodiment, a display device may include a display panel including a plurality of pixels, a data driver configured to provide data signals to the plurality of pixels, a scan driver configured to provide scan signals to the plurality of pixels, an emission driver configured to provide emission signals to the plurality of pixels, a controller configured to control the data driver, the scan driver and the emission driver, and a voltage regulator configured to supply a pixel power supply voltage to the plurality of pixels. The voltage regulator includes a voltage divider configured to generate a feedback voltage by dividing the pixel power supply voltage, an error amplifier configured to generate an amplifier output voltage by comparing a reference voltage and the feedback voltage, a variable phase compensating circuit configured to adjust the amplifier output voltage according to a load current, a source follower buffer configured to generate a control voltage by buffering the adjusted amplifier output voltage, and a pass transistor configured to output, as the pixel power supply voltage, an input voltage based on the control voltage.

In an embodiment, the variable phase compensating circuit may include a first transistor including a gate connected to a gate of the pass transistor, a first terminal for receiving a power supply voltage, and a second terminal, a first resistor including a first terminal connected to the second terminal of the first transistor, and a second terminal, and a first capacitor including a first electrode connected to the second terminal of the first resistor, and a second electrode connected to an amplifier output node at which the amplifier output voltage is output.

In an embodiment, the source follower buffer may include a second transistor including a gate connected to an amplifier output node at which the amplifier output voltage is output, a first terminal connected to a gate of the pass transistor, and a second terminal for receiving a ground voltage, and a variable current source connected between a line for transferring a power supply voltage and the gate of the pass transistor.

In an embodiment, the source follower buffer may include a second transistor including a gate connected to an amplifier output node at which the amplifier output voltage is output, a first terminal connected to a gate of the pass transistor, and a second terminal for receiving a ground voltage, a first current source connected between a line for transferring a power supply voltage and the gate of the pass transistor, a third transistor including a gate connected to the gate of the pass transistor, a first terminal for receiving the power supply voltage, and a second terminal, a fourth transistor including a gate connected to the second terminal of the third transistor, a first terminal connected to the second terminal of the third transistor, and a second terminal for receiving the ground voltage, a fifth transistor including a gate connected to the gate of the fourth transistor, a first terminal, and a second terminal, a second resistor including a first terminal connected to the second terminal of the fifth transistor, and a second terminal for receiving the ground voltage, a sixth transistor including a gate connected to the first terminal of the fifth transistor, a first terminal for receiving the power supply voltage, and a second terminal connected to the first terminal of the fifth transistor, and a seventh transistor including a gate connected to the gate of the sixth transistor, a first terminal for receiving the power supply voltage, and a second terminal connected to the gate of the pass transistor.

As described above, in a voltage regulator and a display device according to embodiments, the voltage regulator may include a variable phase compensating circuit that adjusts an amplifier output voltage according to a load current, and a source follower buffer disposed between an error amplifier and a pass transistor. Accordingly, the voltage regulator according to embodiments may have a phase margin greater than a reference phase margin in an entire load current range from a minimum load current to a maximum load current, and the voltage regulator may stably operate even if the load current changes.

BRIEF DESCRIPTION OF THE DRAWINGS

Illustrative, non-limiting embodiments will be more clearly understood from the following detailed description in conjunction with the accompanying drawings.

DETAILED DESCRIPTION OF THE EMBODIMENTS

Hereinafter, specific embodiments of the present disclosure are explained in detail with reference to the accompanying drawings.

Figure 1:
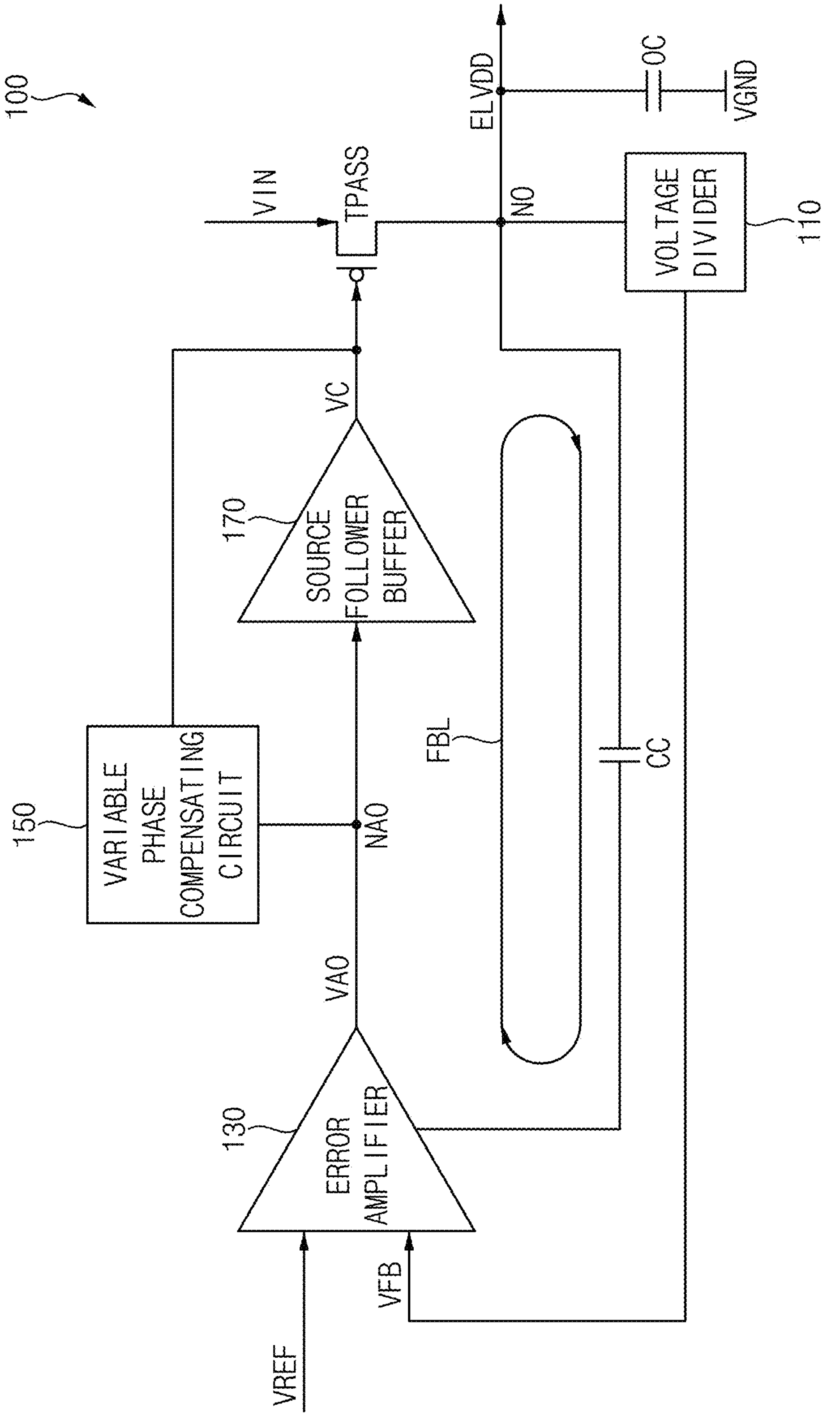
FIG. 1 is a block diagram illustrating a voltage regulator according to an embodiment of the present disclosure.
Figure 2A:
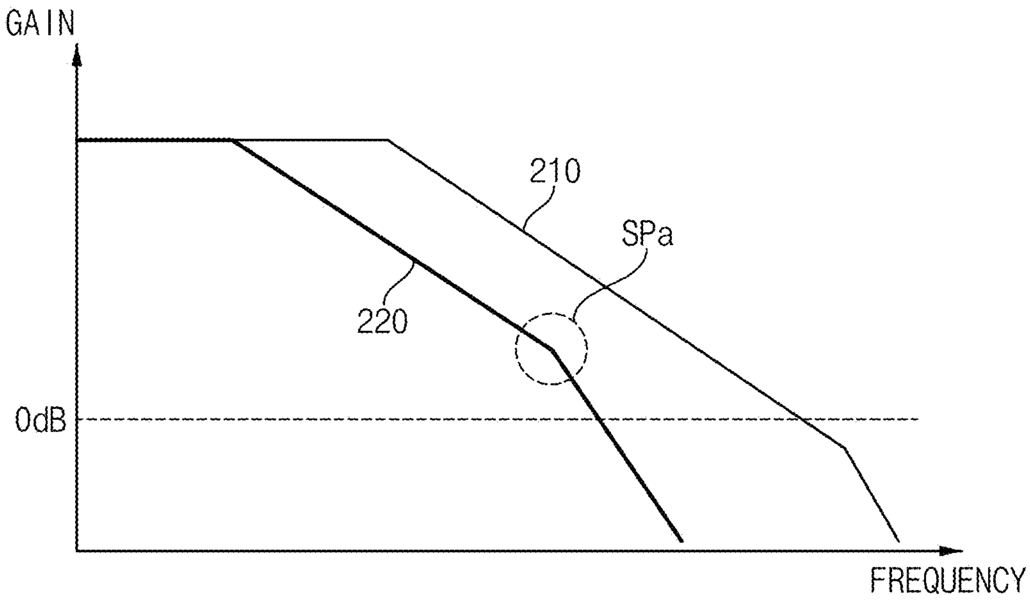
FIG. 2A shows a Bode plot of a voltage regulator according to a comparative embodiment that does not include a variable phase compensating circuit and a source follower buffer and in which a compensation capacitor has a capacitance suitable for a maximum load current.
Figure 2B:
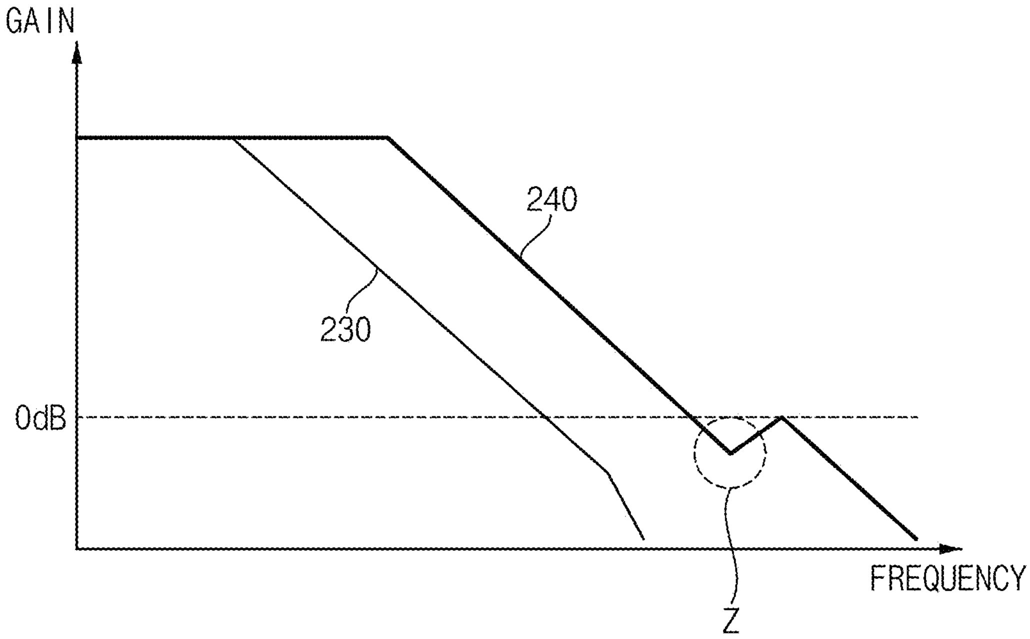
FIG. 2B shows a Bode plot of a voltage regulator according to a comparative embodiment that does not include a variable phase compensating circuit and a source follower buffer and in which a compensation capacitor has a capacitance suitable for a minimum load current.
Figure 3:
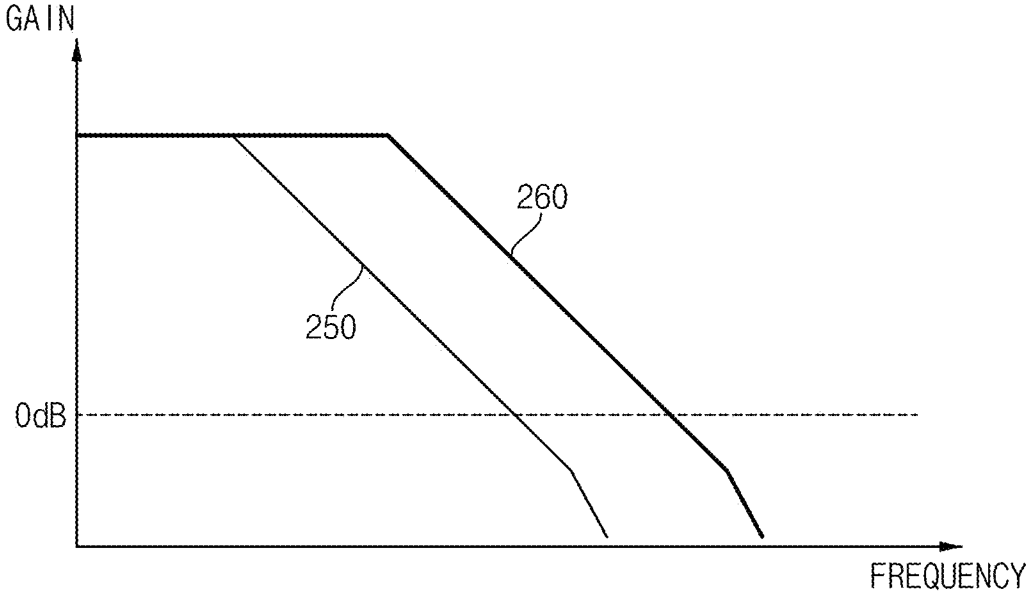
FIG. 3 shows an example of a Bode plot of a voltage regulator according to an embodiment of the present disclosure.

FIG. 1 is a block diagram illustrating a voltage regulator according to an embodiment, FIG. 2A shows a Bode plot of a voltage regulator that does not include a variable phase compensating circuit and a source follower buffer and in which a compensation capacitor has a capacitance suitable for a maximum load current, FIG. 2B shows a Bode plot of a voltage regulator that does not include a variable phase compensating circuit and a source follower buffer and in which a compensation capacitor has a capacitance suitable for a minimum load current, and FIG. 3 shows an example of a Bode plot of a voltage regulator according to an embodiment of the present disclosure.

Referring to FIG. 1, a voltage regulator 100 may be configured to produce and output a pixel power supply voltage ELVDD that may be supplied to pixels of a display panel according to an embodiment of the present disclosure. The voltage regulator 100 may include a voltage divider 110, an error amplifier 130, a variable phase compensating circuit 150, a source follower buffer 170 and a pass transistor TPASS. In some embodiments, the voltage regulator 100 may further include at least one compensation capacitor CC and at least one output capacitor OC.

Figure 7:
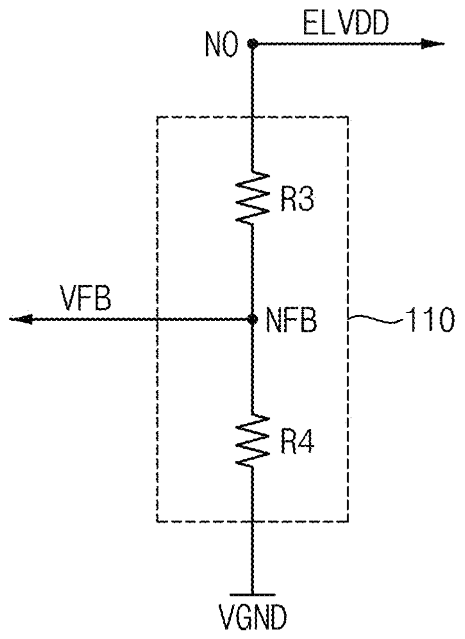
FIG. 7 is a circuit diagram illustrating a voltage divider suitable for a voltage regulator according to an embodiment of the present disclosure.

The voltage divider 110 may generate a feedback voltage VFB by dividing the pixel power supply voltage ELVDD that the voltage regulator 100 outputs. In some embodiments, as illustrated in FIG. 7, the voltage divider 110 may include, but is not limited to, resistors R3 and R4 connected in series between an output node NO at which the pixel power supply voltage ELVDD is output from the voltage regulator 100 and a line for transferring a ground voltage VGND to the voltage regulator 100.

The error amplifier 130 may generate an amplifier output voltage VAO by comparing a reference voltage VREF and the feedback voltage VFB. For example, a first input terminal of the error amplifier 130 may receive the reference voltage VREF from an external circuit, a second input terminal of the error amplifier 130 may receive the feedback voltage VFB from the voltage divider 110, and the error amplifier 130 may output at an amplifier output terminal or node NAO the amplifier output voltage VAO, which corresponds to a difference between the reference voltage VREF and the feedback voltage VFB. In some embodiments, the reference voltage VREF may be, but is not limited to, a bandgap reference voltage that is a substantially constant voltage regardless of a power supply variation, a temperature change, or a circuit loading, etc.

Figure 4:
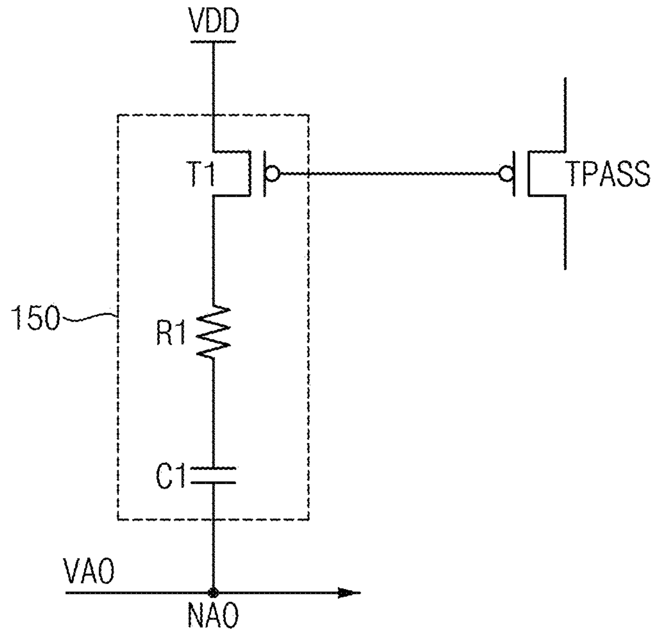
FIG. 4 is a circuit diagram illustrating a variable phase compensating circuit suitable for a voltage regulator according to an embodiment of the present disclosure.

The variable phase compensating circuit 150 may adjust the amplifier output voltage VAO generated by the error amplifier 130 according to a load current for the pixel power supply voltage ELVDD. In some embodiments, the variable phase compensating circuit 150 may adjust the amplifier output voltage VAO by an amount corresponding to the load current, or a current flowing through a line for transferring the pixel power supply voltage ELVDD to the pixels. For example, as illustrated in FIG. 4, the variable phase compensating circuit 150 may include a first transistor T1 having a gate connected to a gate of the pass transistor TPASS. The load current may flow through the pass transistor TPASS to the line transferring the pixel power supply voltage ELVDD to the pixels, and a current proportional to the load current flowing through the pass transistor TPASS may flow through the first transistor T1 having its gate connected to the gate of the pass transistor TPASS. Thus, by providing the current proportional to the load current to a first resistor R1 and a first capacitor C1 in the variable phase compensating circuit 150, the amplifier output voltage VAO may be adjusted by an amount corresponding to the load current.

Figure 5:
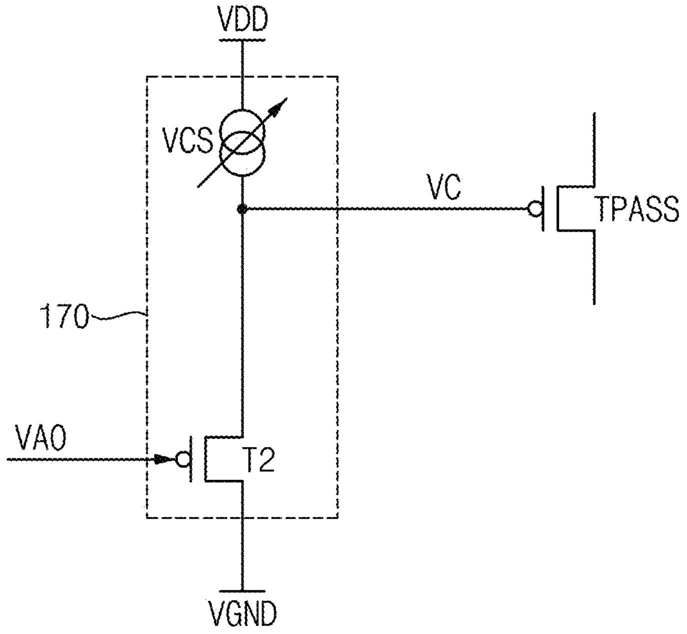
FIG. 5 is a circuit diagram illustrating an example of a source follower buffer suitable for a voltage regulator according to an embodiment of the present disclosure.
Figure 9:
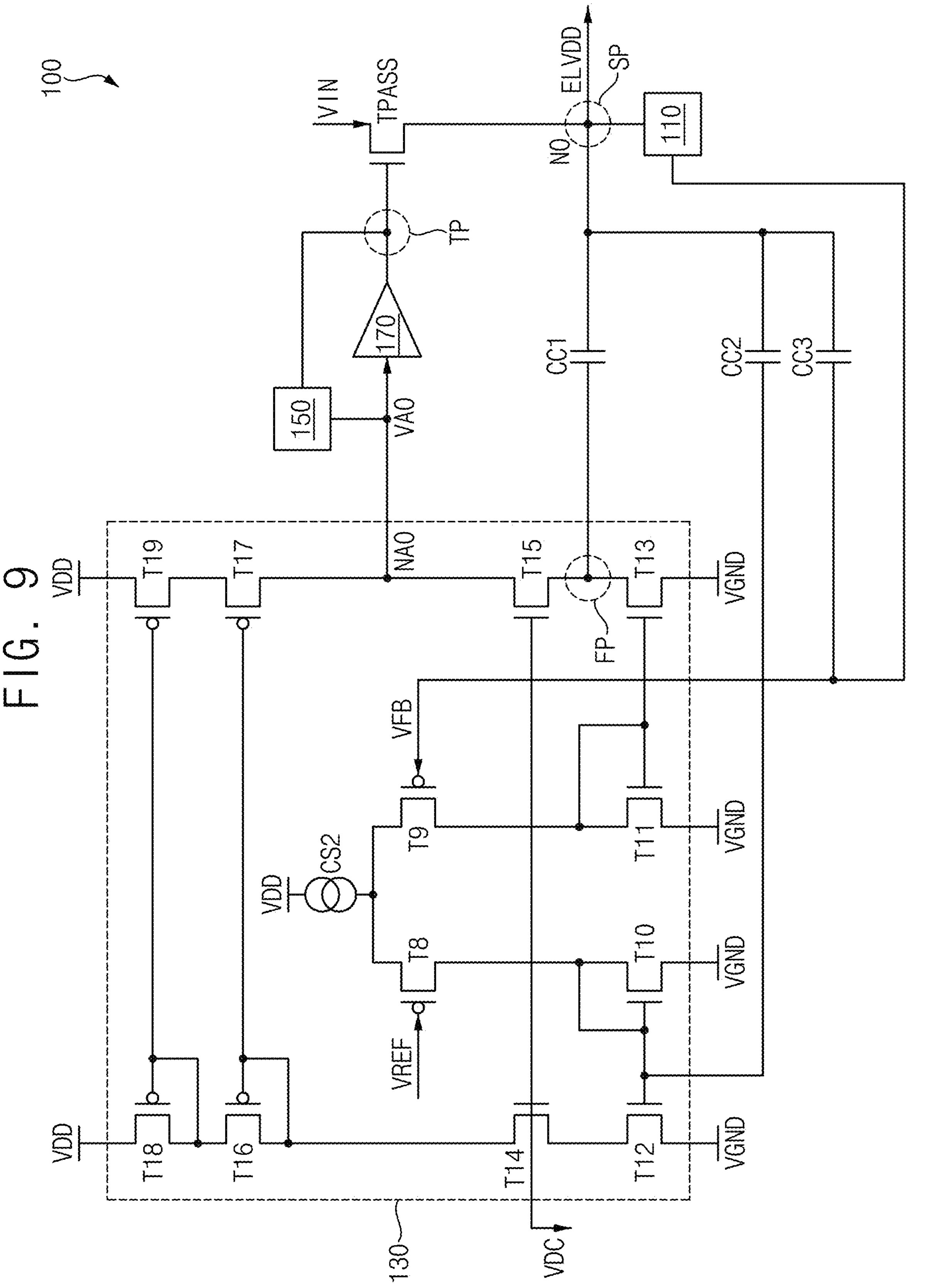
FIG. 9 is a circuit diagram illustrating a voltage regulator according to an embodiment of the present disclosure including compensation capacitors.

The source follower buffer 170 may be disposed between the error amplifier 130 and the pass transistor TPASS and may generate a control voltage VC by buffering the amplifier output voltage VAO as adjusted by the variable phase compensating circuit 150. Since the source follower buffer 170 is between the error amplifier 130 and the pass transistor TPASS, the gate of the pass transistor TPASS may be driven with low impedance. Further, through use of the source follower buffer 170 as illustrated in FIG. 9, a third pole TP of a feedback loop FBL generated at the gate of the pass transistor TPASS may be moved to a high frequency region. In some embodiments, the source follower buffer 170 may include a variable current source VCS as illustrated in FIG. 5. In this case, a current of the variable current source VCS (e.g., a circuit including a first current source CS1, third through seventh transistors T3 through T7 and a second resistor R2 illustrated in FIG. 6) may increase as the load current (or a current flowing through the pass transistor TPASS) increases. Accordingly, the driving ability of the pass transistor TPASS may be improved, and thus a performance of the voltage regulator 100 may be improved.

A first terminal of the pass transistor TPASS receives an input voltage VIN, a second terminal of the pass transistor TPASS is connected to the output node NO, and a gate of the pass transistor TPASS receives the control signal VC from the source follower buffer 170. The pass transistor TPASS may control the pixel power supply voltage ELVDD supplied to the pixels, based on the input voltage VIN and the control voltage VC. In some embodiments, the input voltage VIN may be a voltage provided from an external device (e.g., a battery), or a voltage that a power management circuit, e.g., a power management integrated circuit (PMIC), generates based on the voltage provided from the external device. The pixel power supply voltage ELVDD output by the pass transistor TPASS may be provided to the pixels of the display panel, and the pixels may emit light based on the pixel power supply voltage ELVDD.

The output capacitor OC may be connected between the output node NO at which the pixel power supply voltage ELVDD is output and the line transferring the ground voltage VGND to the voltage regulator 100. The output capacitor OC may stabilize the pixel power supply voltage ELVDD. In some embodiments, the output capacitor OC may include a first electrode connected to the output node NO and a second electrode connected to the line transferring the ground voltage VGND.

The compensation capacitor CC may be connected between the output node NO and the error amplifier 130. The compensation capacitor CC may compensate for a phase of the feedback voltage VFB in the feedback loop FBL. In some embodiments, as illustrated in FIG. 9, the voltage regulator 100 may include, but is not limited to, a first compensation capacitor CC1 connected between the output node NO and a source of a fifteenth transistor T15, a second compensation capacitor CC2 connected between the output node NO and gates of tenth and twelfth transistors T10 and T12, and a third compensation capacitor (CC3) connected between the output node NO and the second input terminal of the error amplifier 130, which is connected to receive the feedback voltage VFB.

A comparative example of a voltage regulator that is similar to the voltage regulator 100 but does not include the variable phase compensating circuit 150 and the source follower buffer 170, the voltage regulator 100 may not stably operate, which may cause the pixel power supply voltage ELVDD to vary according to the load current. FIGS. 2A and 2B illustrate Bode plots for respective voltage regulators that are similar to the voltage regulator 100 but that do not include the variable phase compensating circuit 150 and the source follower buffer 170. A Bode plot graphs the frequency response of a system. For example, the Bode plots of FIGS. 2A and 2B may represent gain of the feedback loop FBL according to a frequency of a sine signal when the sine signal is applied as the feedback voltage VFB to the feedback loop FBL in the comparative examples.

FIG. 2A corresponds to a comparative example in which the compensation capacitor CC has a capacitance suitable for a maximum load current (e.g., about 200 mA) as the load current and neither the variable phase compensating circuit 150 nor the source follower buffer 170 is present. As illustrated in FIG. 2A, a gain curve 210 of the feedback loop FBL for the maximum load current may have a second pole at a gain below about 0 dB, i.e., below a unity gain. However, in this case, a gain curve 220 of the feedback loop FBL for a minimum load current (or no-load current) (e.g., about 0 mA) may have a second pole SPa at a gain above about 0 dB, i.e., above the unity gain. Since each pole shifts a phase of the feedback voltage VFB or a sine signal in the feedback loop FBL by about-90 degrees, if the second pole SPa is greater than the unity gain, the feedback loop FBL may not have a sufficient phase margin, and the voltage regulator 100 may not operate stably when the load current is the minimum load current.

FIG. 2B corresponds to a comparative example in which the compensation capacitor CC has a capacitance suitable for the minimum load current (e.g., about 0 mA) as the load current and neither the variable phase compensating circuit 150 nor the source follower buffer 170 is present. As illustrated in FIG. 2B, a gain curve 230 of the feedback loop FBL for the minimum load current may have a second pole below the unity gain. However, in this case, a gain curve 240 of the feedback loop FBL for the maximum load current (e.g., about 200 mA) may have a zero Z adjacent to the second pole. When the pole and the zero Z are adjacent to each other, the feedback loop FBL may be unstable, and the voltage regulator including the feedback loop FBL in the comparative example corresponding to FIG. 2B may oscillate.

In the voltage regulator 100 according to embodiments, the variable phase compensating circuit 150 may adjust or compensate the phase of the signal at the amplifier output node NAO by the amount appropriate for the load current. That is, the variable phase compensating circuit 150 may cancel a change in impedance of each element of the voltage regulator 100 due to a change of the load current. Further, the source follower buffer 170 disposed between the error amplifier 130 and the pass transistor TPASS may drive the gate of the pass transistor TPASS with low impedance. Accordingly, in the voltage regulator 100 including the variable phase compensating circuit 150 and the source follower buffer 170 according to embodiments, both of a gain curve 250 of the feedback loop FBL for the minimum load current and a gain curve 260 of the feedback loop FBL for the maximum load current may have a second pole below the unity gain as illustrated in FIG. 3. Accordingly, the voltage regulator 100 may have a phase margin greater than a reference phase margin in the entire load current range from the minimum load current to the maximum load current, and the voltage regulator 100 may stably operate. That is, the voltage regulator 100 according to embodiments may stably operate even if the load current changes. Although FIG. 3 illustrates an example of a Bode plot of the voltage regulator 100 including two poles, the Bode plot of the voltage regulator 100 according to embodiments is not limited to the example of FIG. 3, and the feedback loop FBL of the voltage regulator 100 may have three or more poles in other embodiments.

FIG. 4 is a circuit diagram illustrating a variable phase compensating circuit that may be included in a voltage regulator according to embodiments disclosed herein.

A variable phase compensating circuit 150 in accordance with the embodiment illustrated in FIG. 4 may include a first transistor T1, a first resistor R1 and a first capacitor C1.

A gate of the first transistor T1 may be connected to a gate of a pass transistor TPASS. That is, the gate of the first transistor T1 and the gate of the pass transistor TPASS may receive the same control voltage. Thus, depending on a size ratio between the pass transistor TPASS and the first transistor T1, a current proportional to a load current flowing through the pass transistor TPASS may flow through the first transistor T1. For example, the pass transistor TPASS and the first transistor T1 may have, but is not limited to, a size ratio of 1,000:1, and a current of about 1/1000 of the load current of the pass transistor TPASS may flow through the first transistor T1. In some embodiments, the first transistor T1 may include the gate connected to the gate of the pass transistor TPASS, a first terminal for receiving a power supply voltage VDD, and a second terminal connected to the first resistor R1. Further, in some embodiments, the pass transistor TPASS and the first transistor T1 may be implemented as, but are not limited to, P-type metal oxide semiconductor (PMOS) transistors.

The first resistor R1 and the first capacitor C1 may be connected in series between the first transistor T1 and an amplifier output node NAO, e.g., the amplifier output terminal NAO of the error amplifier 130 shown in FIG. 1. In some embodiments, the first resistor R1 may include a first terminal connected to the second terminal of the first transistor T1 and a second terminal connected to the first capacitor C1, and the first capacitor C1 may include a first electrode connected to the second terminal of the first resistor R1 and a second electrode connected to the amplifier output node NAO at which an amplifier output voltage VAO is output.

The current flowing through the first transistor T1 may be provided to the first resistor R1 and the first capacitor C1, and thus may adjust the amplifier output voltage VAO at the amplifier output node NAO. In particular, since the current flowing through the first transistor T1 is proportional to the load current flowing through the pass transistor TPASS, the phase compensating circuit 150 may adjust the amplifier output voltage VAO by an amount corresponding to the load current. Accordingly, the phase compensating circuit 150 may perform a phase compensation operation appropriate for the load current for any load current level in the entire load current range from a minimum load current to a maximum load current.

FIG. 5 is a circuit diagram illustrating an example of a source follower buffer that may be included in a voltage regulator according to embodiments disclosed herein.

A source follower buffer 170 according to the embodiment shown in FIG. 5 may include a second transistor T2 and a variable current source VCS.

The second transistor T2 may receive an amplifier output voltage VAO as an input voltage at its gate, and a control voltage VC from the source follower 170 may be an output voltage at its first terminal (e.g., a source) of the second transistor T2. In some embodiments, the second transistor T2 may include the gate connected to an amplifier output node at which the amplifier output voltage VAO is output, a first terminal connected to a gate of a pass transistor TPASS, and a second terminal for receiving a ground voltage VGND. Further, in some embodiments, the second transistor T2 may be implemented as a PMOS transistor.

The variable current source VCS may provide a current to the second transistor T2. In some embodiments, the current provided by the variable current source VCS may increase as the load current increases. Further, in some embodiments, the variable current source VCS may be connected between a line for transferring a power supply voltage VDD and the gate of the pass transistor TPASS or the first terminal of the second transistor T2.

The source follower buffer 170 may output the control voltage VC having substantially the same voltage level as the amplifier output voltage VAO. Since the amplifier output voltage VAO is not directly applied to the gate of the pass transistor TPASS and instead the control voltage VC generated by the source follower buffer 170 based on the amplifier output voltage VAO is applied to the gate of the pass transistor TPASS, the gate of the pass transistor TPASS can be driven with low impedance. Further, a third pole generated at the gate of the pass transistor TPASS may be moved to a high frequency region by the source follower buffer 170.

Figure 6:
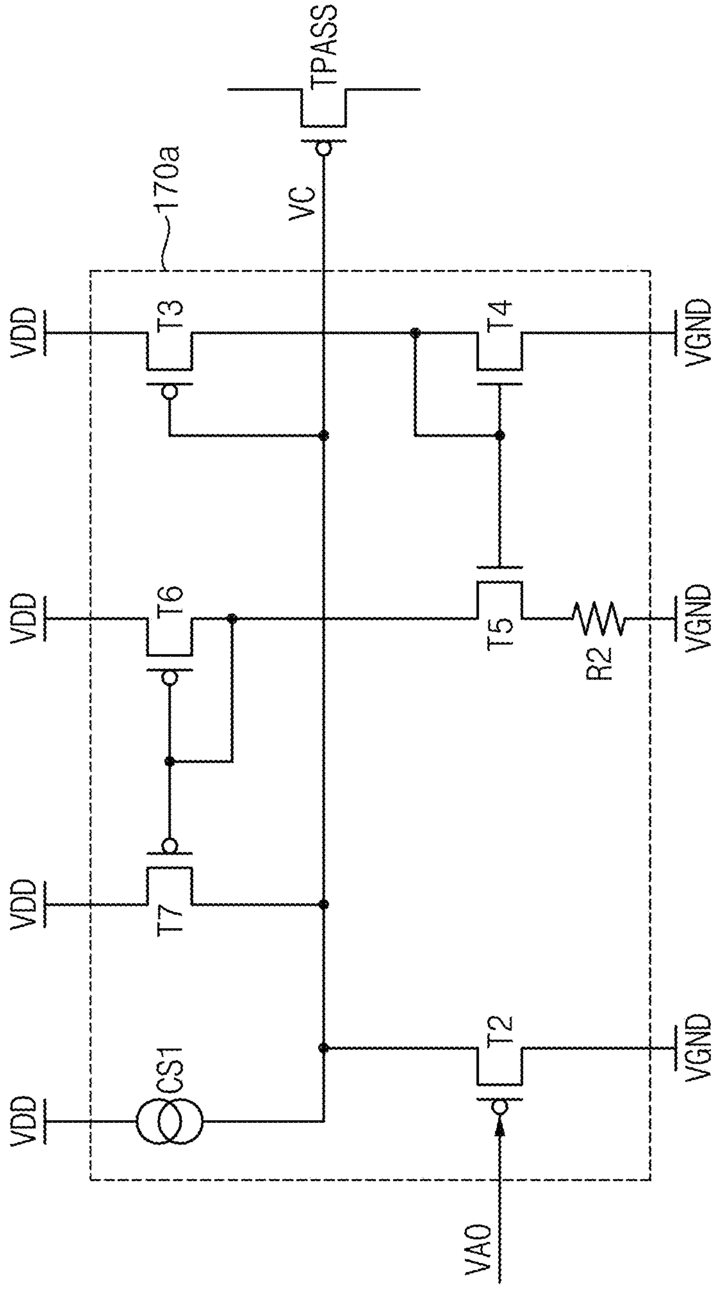
FIG. 6 is a circuit diagram illustrating another example of a source follower buffer suitable for a voltage regulator according to an embodiment of the present disclosure.

FIG. 6 is a circuit diagram illustrating another example of a source follower buffer that may be included in a voltage regulator according to embodiments of the present disclosure.

Referring to FIG. 6, a source follower buffer 170*a* may include a second transistor T2, a first current source CS1, a third transistor T3, a fourth transistor T4, a fifth transistor T5, a second resistor R2, a sixth transistor T6, and a seventh transistor T7. The source follower buffer 170*a* of FIG. 6 includes the second transistor T2 connected between a current source and the ground voltage VGND the same as a source follower buffer 170 of FIG. 5, but the source follower buffer 170*a* may include the first current source CS1, the third transistor T3, the fourth transistor T4, the fifth transistor T5, the second resistor R2, the sixth transistor T6 and the seventh transistor T7.

The first current source CS1 may be connected between a line for transferring a power supply voltage VDD and a gate of a pass transistor TPASS. The first current source CS1 may provide a current to the second transistor T2 even when a load current is a minimum load current, or even when the seventh transistor T7 does not provide a current to the second transistor T2.

A gate of the third transistor T3 may be connected to the gate of the pass transistor TPASS. Thus, a current corresponding to the load current of the pass transistor TPASS may flow through the third transistor T3. In some embodiments, the third transistor T3 may include the gate connected to the gate of the pass transistor TPASS, a first terminal for receiving the power supply voltage VDD, and a second terminal connected to the fourth transistor T4. Further, in some embodiments, the third transistor T3 may be implemented as a PMOS transistor.

The fourth transistor T4 may be connected in series to the third transistor T3. Thus, the current flowing through the third transistor T3 may flow through the fourth transistor T4. Further, the fourth transistor T4 and the fifth transistor T5 may form a current mirror, and a second resistor R2 may be connected to a second terminal (e.g., a source) of the fifth transistor T5. Thus, a current proportional to the current flowing through the fourth transistor T4 may flow through the fifth transistor T5. In some embodiments, the fourth transistor T4 may include a gate connected to the second terminal of the third transistor T3, a first terminal connected to the second terminal of the third transistor T3, and a second terminal for receiving the ground voltage VGND, the fifth transistor T5 may include a gate connected to the gate of the fourth transistor T4, a first terminal connected to the sixth transistor T6, and a second terminal connected to the second resistor R2, and the second resistor R2 may include a first terminal connected to the second terminal of the fifth transistor T5 and a second terminal for receiving the ground voltage VGND. Further, in some embodiments, the fourth transistor T4 and the fifth transistor T5 may be implemented as N-type metal oxide semiconductor (NMOS) transistors.

The sixth transistor T6 may be connected in series to the fifth transistor T5. Thus, the current flowing through the fifth transistor T5 may flow through the sixth transistor T6. Further, the sixth transistor T6 and the seventh transistor T7 may form a current mirror. Thus, a current having the same current level as the current flowing through the sixth transistor T6, or the current flowing through the fifth transistor T5 may flow through the seventh transistor T7. Further, the current flowing through the fifth transistor T5 may be proportional to the load current as is the current flowing through the fourth transistor T4 and the third transistor T3. Thus, the seventh transistor T7 may provide a current proportional to the load current to the second transistor T2. Accordingly, when the load current increases from a minimum load current to a maximum load current, the current provided to the second transistor T2 may increase, a driving ability of the source follower buffer 170*a* may be improved. Thus, the source follower buffer 170*a* may rapidly generate a control voltage VC quickly drive the pass transistor TPASS. In some embodiments, the sixth transistor T6 may include a gate connected to the first terminal of the fifth transistor T5, a first terminal for receiving the power supply voltage VDD, and a second terminal connected to the first terminal of the fifth transistor T5, and the seventh transistor T7 may include a gate connected to the gate of the sixth transistor T6, a first terminal for receiving the power supply voltage VDD, and a second terminal connected to the gate of the pass transistor TPASS. Further, in some embodiments, the sixth and seventh transistors T6 and T7 may be implemented as PMOS transistors.

FIG. 7 is a circuit diagram illustrating a voltage divider that may be included in a voltage regulator according to embodiments of the present disclosure.

A voltage divider 110 in accordance with the embodiment illustrated in FIG. 7 may include a third resistor R3 and a fourth resistor R4.

The third resistor R3 and the fourth resistor R4 may be connected in series between an output node NO at which a pixel power supply voltage ELVDD is output and a line for transferring a ground voltage VGND. Thus, the voltage divider 110 may generate a feedback voltage VFB that depends on the pixel power supply voltage ELVDD and the resistances of the third resistor R3 and the fourth resistor R4. In some embodiments, the third resistor R3 may include a first terminal connected to the output node NO and a second terminal connected to a feedback node NFB at which the feedback voltage VFB is output, and the fourth resistor R4 may include a first terminal connected to the feedback node NFB and a second terminal for receiving the ground voltage VGND.

Figure 8:
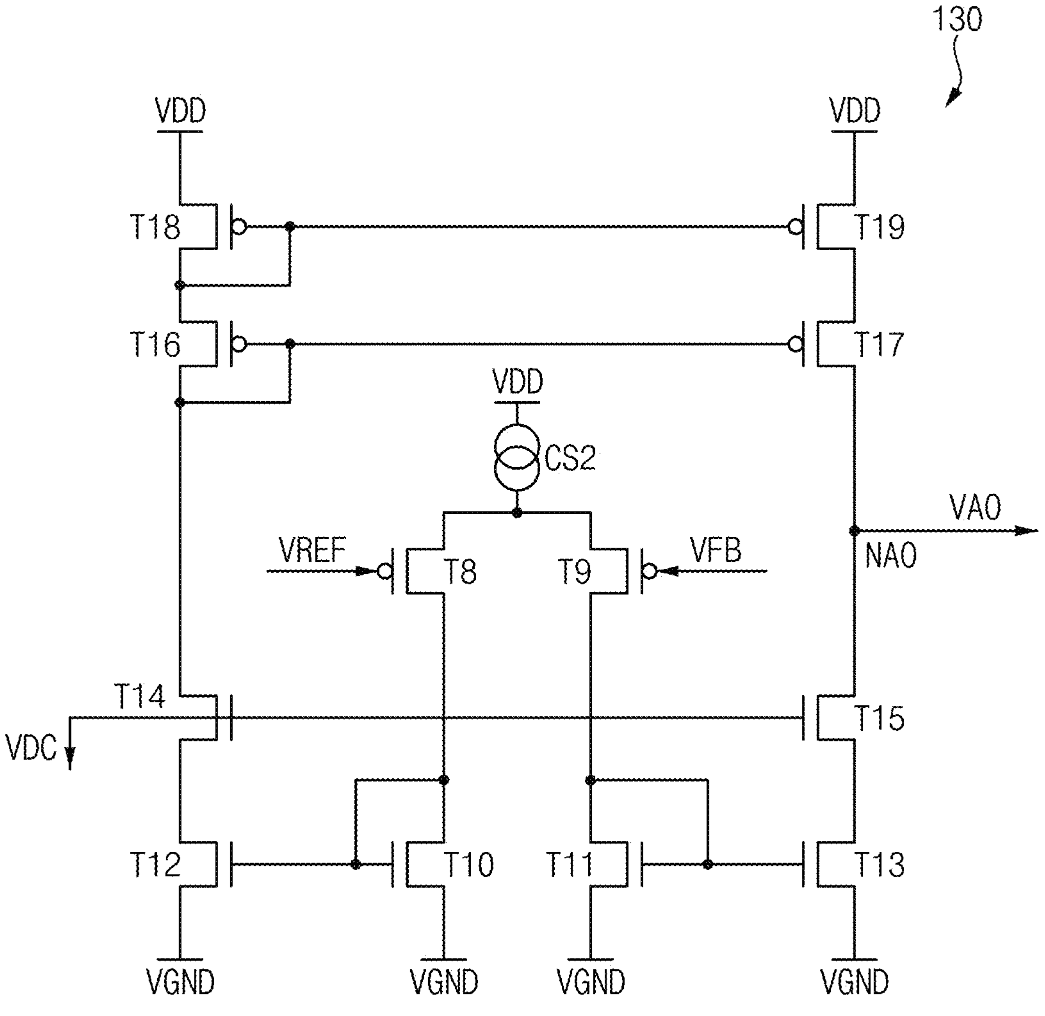
FIG. 8 is a circuit diagram illustrating an error amplifier suitable for a voltage regulator according to an embodiment of the present disclosure.

FIG. 8 is a circuit diagram illustrating an error amplifier included in a voltage regulator according to embodiments.

FIG. 8 shows an error amplifier 130 in accordance with an embodiment that may include an eighth transistor T8, a ninth transistor T9, a second current source CS2, a tenth transistor T10, an eleventh transistor T11, a twelfth transistor T12, a thirteenth transistor T13, a fourteenth transistor T14, a fifteenth transistor T15, a sixteenth transistor T16, a seventeenth transistor T17, an eighteenth transistor T18, and a nineteenth transistor T19. This error amplifier 130 may generate an amplifier output voltage VAO corresponding to a difference between a reference voltage VREF and a feedback voltage VFB.

In some embodiments, the eighth transistor T8 may include a gate for receiving the reference voltage VREF, a first terminal, and a second terminal. The ninth transistor T9 may include a gate for receiving the feedback voltage VFB, a first terminal, and a second terminal. The second current source CS2 may be connected between a line for transferring a power supply voltage VDD and the first terminals of the eighth and ninth transistors T8 and T9. Thus, a current from the second current source CS2 may be divided into a current flowing through the eighth transistor T8 and a current flowing through the ninth transistor T9.

The tenth transistor T10 may include a gate connected to the second terminal of the eighth transistor T8, a first terminal connected to the second terminal of the eighth transistor T8, and a second terminal for receiving a ground voltage VGND. The eleventh transistor T11 may include a gate connected to the second terminal of the ninth transistor T9, a first terminal connected to the second terminal of the ninth transistor T9, and a second terminal for receiving the ground voltage VGND. The twelfth transistor T12 may include a gate connected to the gate of the tenth transistor T10, a first terminal, and a second terminal for receiving the ground voltage VGND, and the thirteenth transistor T13 may include a gate connected to the gate of the eleventh transistor T11, a first terminal, and a second terminal for receiving the ground voltage VGND. The tenth transistor T10 and the twelfth transistor T12 may form a current mirror, and the eleventh transistor T11 and the thirteenth transistor T13 may form a current mirror.

The fourteenth transistor T14 may include a gate for receiving a direct current (DC) voltage VDC, a first terminal, and a second terminal connected to the first terminal of the twelfth transistor T12, and the fifteenth transistor T15 may include a gate for receiving the DC voltage VDC, a first terminal connected to an amplifier output node NAO at which the amplifier output voltage VAO is output, and a second terminal connected to the first terminal of the thirteenth transistor T13. Since the fourteenth and fifteenth transistors T14 and T15 receive the DC voltage VDC, the gates of the fourteenth and fifteenth transistors T14 and T15 may be grounded with respect to an alternate current (AC) component.

The sixteenth transistor T16 may include a gate connected to the first terminal of the fourteenth transistor T14, a first terminal, and a second terminal connected to the first terminal of the fourteenth transistor T14. The seventeenth transistor T17 may include a gate connected to the gate of the sixteenth transistor T16, a first terminal, and a second terminal connected to the amplifier output node NAO. The eighteenth transistor T18 may include a gate connected to the first terminal of the sixteenth transistor T16, a first terminal for receiving the power supply voltage VDD, and a second terminal connected to the first terminal of the sixteenth transistor T16, and the nineteenth transistor T19 may include a gate connected to the gate of the eighteenth transistor T18, a first terminal for receiving the power supply voltage VDD, and a second terminal connected to the first terminal of the seventeenth transistor T17.

In some embodiments, as illustrated in FIG. 8, the eighth transistor T8, the ninth transistor T9, the sixteenth transistor T16, the seventeenth transistor T17, the eighteenth transistor T18 and the nineteenth transistor T19 may be implemented as PMOS transistors, and the tenth transistor T10, the eleventh transistor T11, the twelfth transistor T12, the thirteenth transistor T13, the fourteenth transistor T14 and the fifteenth transistor T15 may be implemented as NMOS transistors. Although FIG. 8 illustrates an example of the error amplifier 130, the error amplifier 130 of voltage regulators according to embodiments of the present disclosure is not limited to the example of FIG. 8.

FIG. 9 is a circuit diagram illustrating an example of compensation capacitors included in a voltage regulator according to embodiments.

Referring to FIG. 9, a voltage regulator 100 may include a first compensation capacitor CC1, a second compensation capacitor CC2, and a third compensation capacitor CC3.

The first compensation capacitor CC1 may be connected between an output node NO at which a pixel power supply voltage ELVDD is output and a second terminal (e.g., a source) of a fifteenth transistor T15 of an error amplifier 130, and the second compensation capacitor CC2 may be connected between the output node NO and gates of tenth and twelfth transistors T10 and T12 of the error amplifier 130. The first and second compensation capacitors CC1 and CC2 may perform a phase compensating operation at a signal frequency where nodes of a feedback loop of the voltage regulator 100 have an opposite phase of, e.g., are about 180 degrees out of phase with, the pixel power supply voltage ELVDD, and the phase compensating operation may move a second pole SP in the Bode plot for the feedback loop to a region below a unity gain by moving a frequency corresponding to the unity gain to a low frequency. In some embodiments, the first compensation capacitor CC1 may include a first electrode connected to the output node NO and a second electrode connected to the second terminal of the fifteenth transistor T15, and the second compensation capacitor CC2 may include a first electrode connected to the output node NO, and a second electrode connected to the gates of the tenth and twelfth transistors T10 and T12.

The third compensation capacitor CC3 may be connected between the output node NO and a gate of a ninth transistor T9 of the error amplifier 130 to which a feedback voltage VFB is applied. The third compensation capacitor CC3 may function as a high pass filter and may form a zero in the Bode plot for the feedback loop, thereby moving the second pole SP to a high frequency. Accordingly, a frequency interval between a first pole FP and the second pole SP for the feedback loop may be increased, and the voltage regulator 100 may have a sufficient phase margin. In some embodiments, the third compensation capacitor CC3 may include a first electrode connected to the output node NO and a second electrode connected to the gate of the ninth transistor T9.

In the voltage regulator 100 according to embodiments, the first pole FP may be generated at the second terminal of the fifteenth transistor T15, the second pole SP may be generated at the output node NO, and a third pole TP may be generated at a gate of a pass transistor TPASS. By placing a source follower buffer 170 between an amplifier output node NAO and the gate of the pass transistor TPASS where the third pole TP is generated, the third pole TP may be moved to a high frequency, and the voltage regulator 100 may have a further sufficient phase margin.

Figure 10:
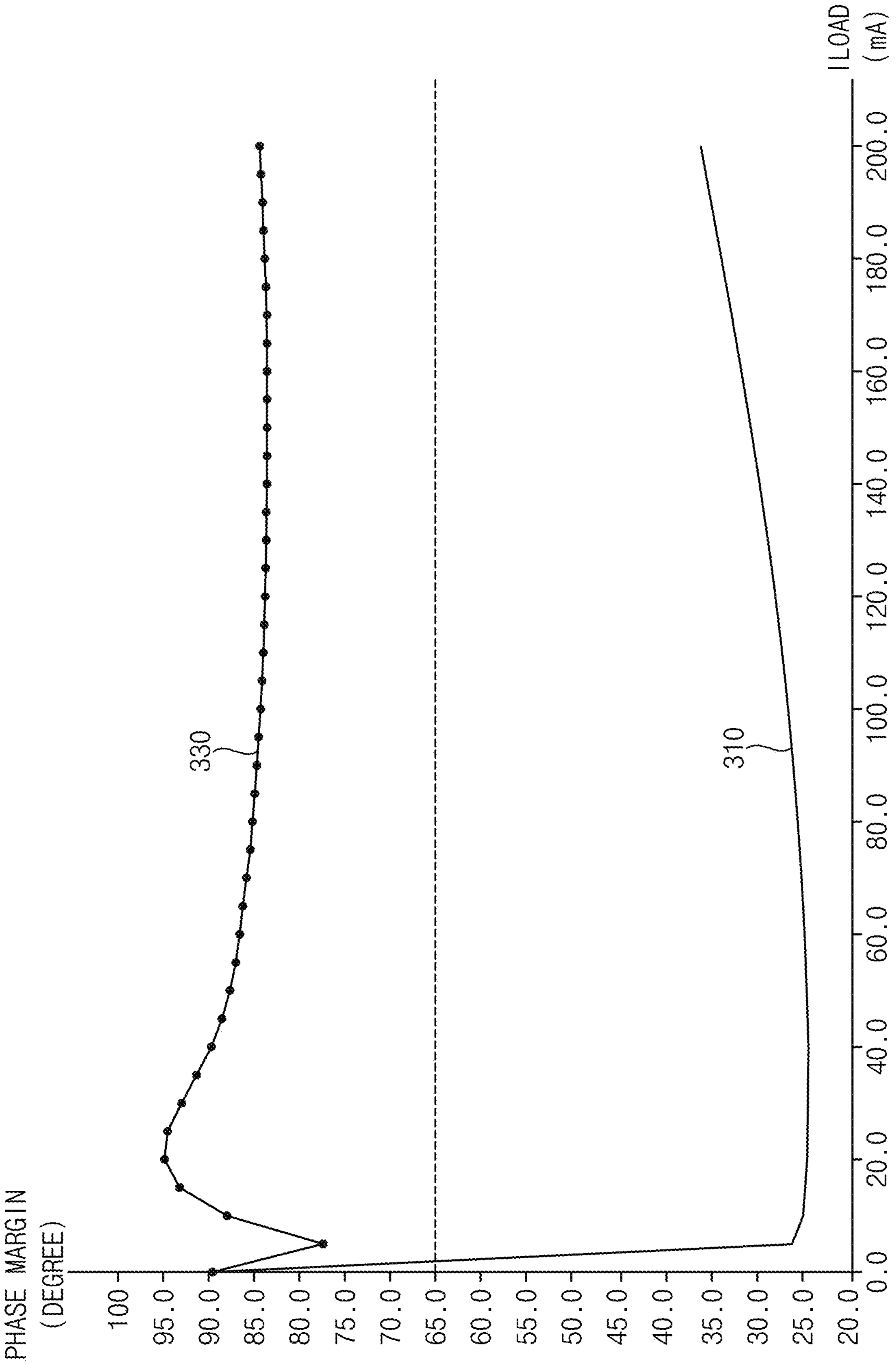
FIG. 10 shows plots of a phase margin of a voltage regulator that does not include a variable phase compensating circuit and a source follower buffer and a phase margin of a voltage regulator according to an embodiment of the present disclosure.

FIG. 10 illustrates a phase margin of a voltage regulator according to a comparative example that does not include a variable phase compensating circuit and a source follower buffer, and a phase margin of a voltage regulator according to an embodiment of the present disclosure.

As illustrated in FIG. 10, if a voltage regulator does not include a variable phase compensating circuit and a source follower buffer, the voltage regulator may have a phase margin 310 that for most of a range of a load current ILOAD, is less than a reference phase margin of about 65 degrees. However, a voltage regulator according to an embodiment in accordance with the present disclosure may have a phase margin 330 that is higher than the reference phase margin over the entire range of the load current ILOAD from a minimum load current (e.g., about 0 mA) to a maximum load current (e.g., about 200 mA). Thus, the voltage regulator according to disclosed embodiments may stably operate in the entire range of the load current ILOAD.

Figure 11:
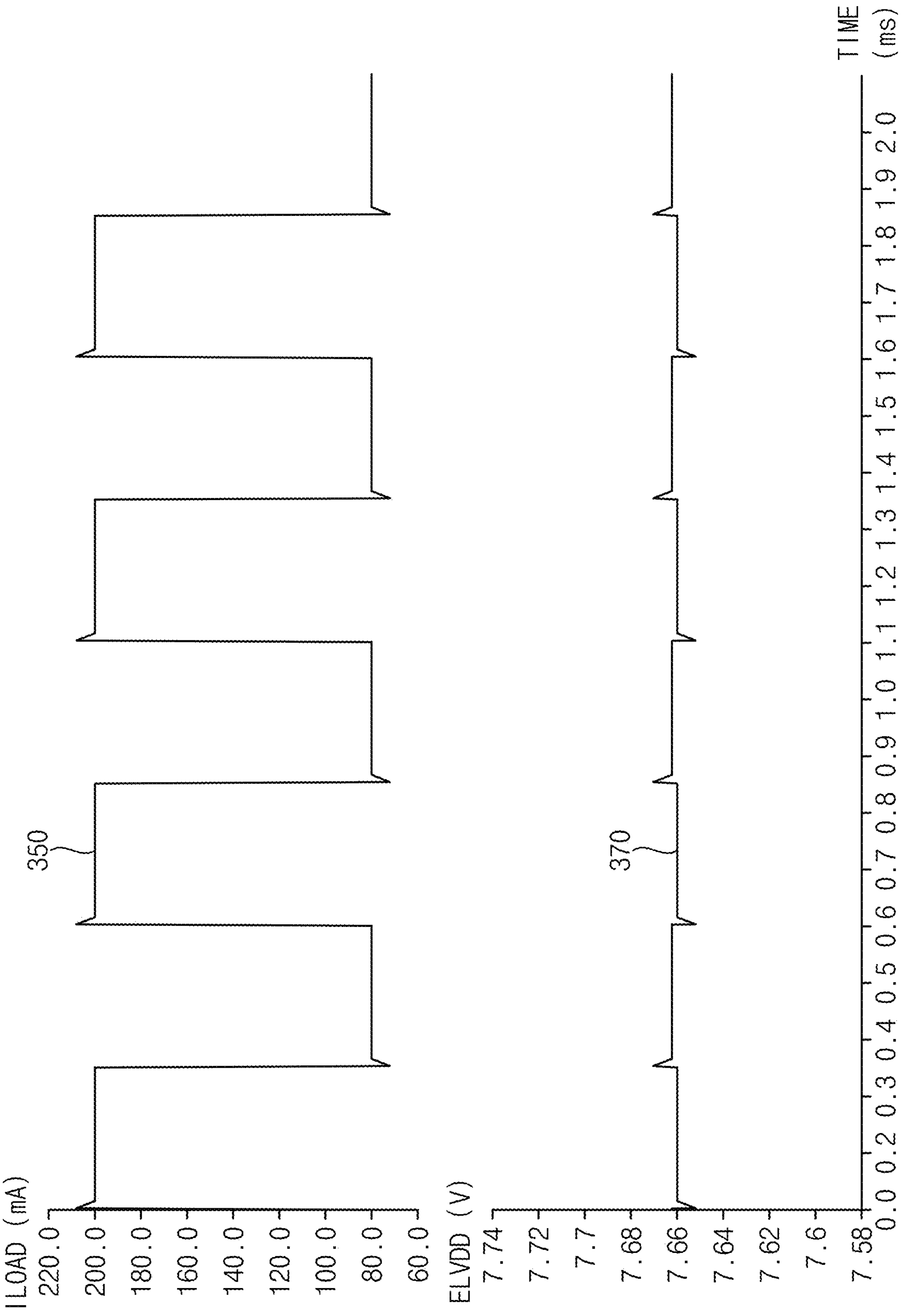
FIG. 11 shows plots of a pixel power supply voltage output by a voltage regulator according to embodiments when a load current changes.

FIG. 11 illustrates an example of a pixel power supply voltage output by a voltage regulator according to an embodiment of the present disclosure when a load current changes.

FIG. 11 particularly shows a graph 350 of a load current ILOAD and a graph 370 of a pixel power supply voltage ELVDD over time. Referring to FIG. 11, even if the load current ILOAD transitions between about 200 mA and about 80 mA, a voltage regulator according to an embodiment of the current disclosure may output the pixel power supply voltage ELVDD having a substantially constant voltage level. That is, the voltage regulator according to a disclosed embodiment may stably operate even if the load current ILOAD changes.

Figure 12:
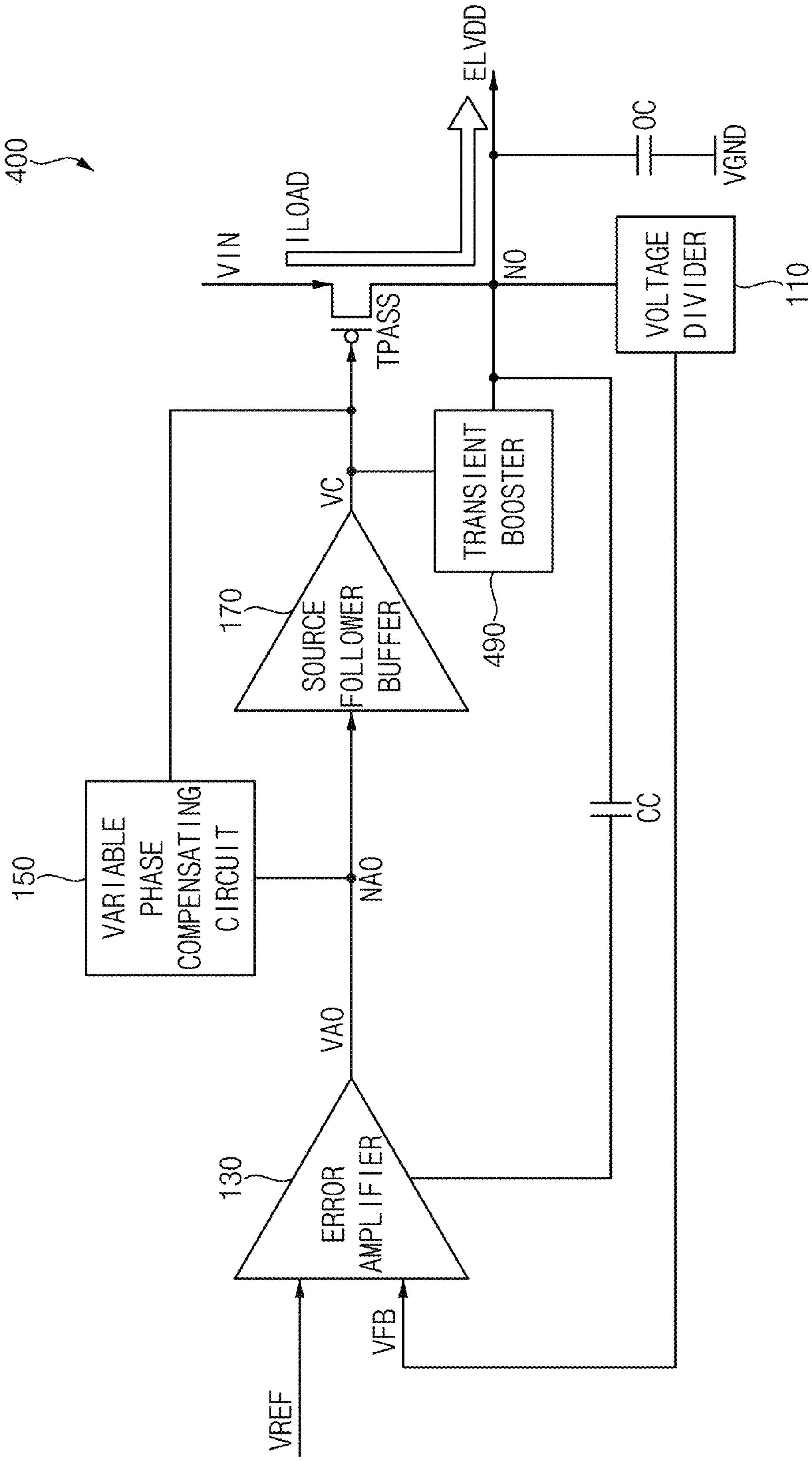
FIG. 12 is a block diagram illustrating a voltage regulator according to an embodiment of the present disclosure.
Figure 13:
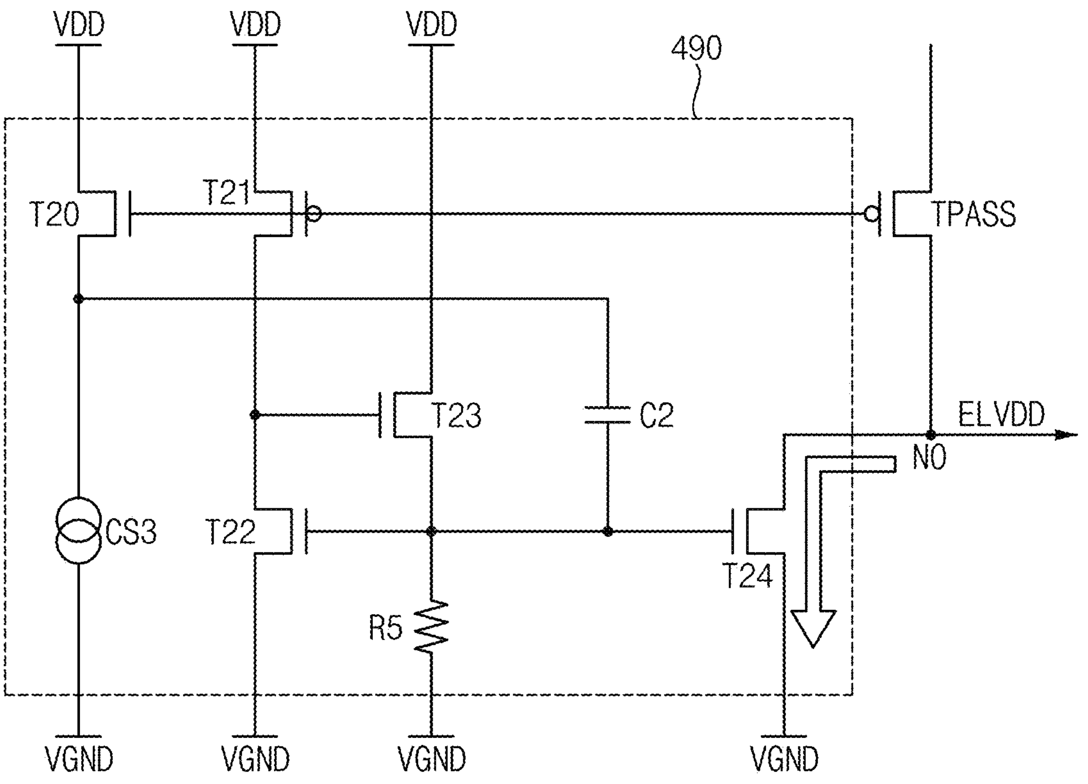
FIG. 13 is a circuit diagram illustrating a transient booster included in a voltage regulator according to an embodiment of the present disclosure.

FIG. 12 is a block diagram illustrating a voltage regulator according to an embodiment of the present disclosure, and as shown in FIG. 13, a transient booster may be included in a voltage regulator according to an embodiment of the present disclosure.

FIG. 12 particularly shows a voltage regulator 400 according to an embodiment that may include a voltage divider 110, an error amplifier 130, a variable phase compensating circuit 150, a source follower buffer 170, a pass transistor TPASS, at least one compensation capacitor CC, an output capacitor OC, and a transient booster 490. The voltage regulator 400 of FIG. 12 may be substantially the same as the voltage regulator 100 of FIG. 1, except that the voltage regulator 400 may further include the transient booster 490.

The transient booster 490 may adjust a pixel power supply voltage ELVDD in a transient state where the load current ILOAD changes. In some embodiments, when the load current ILOAD changes from a maximum load current to a minimum load current and a pixel power supply voltage ELVDD suddenly increases, the transient booster 490 may rapidly adjust the pixel power supply voltage ELVDD to a desired voltage level by sinking a current from an output node NO.

In some embodiments, as illustrated in FIG. 13, the transient booster 490 may include a twentieth transistor T20, a twenty-first transistor T21, a twenty-second transistor T22, a twenty-third transistor T23, a twenty-fourth transistor T24, a third current source, a fifth resistor R5, and a second capacitor C2. The twentieth transistor T20 has a gate connected to a gate of the pass transistor TPASS, a first terminal for receiving a power supply voltage VDD, and a second terminal connected to the third current source CS3. The third current source CS3 is connected between the second terminal of the twentieth transistor T20 and a line for transferring a ground voltage VGND. The twenty-first transistor T21 has a gate connected to the gate of the pass transistor TPASS, a first terminal for receiving the power supply voltage VDD, and a second terminal connected to the twenty-second transistor T22. The twenty-second transistor T22 has a gate, a first terminal connected to the second terminal of the twenty-first transistor T21, and a second terminal for receiving the ground voltage VGND. The twenty-third transistor T23 has a gate connected to the second terminal of the twenty-first transistor T21, a first terminal for receiving the power supply voltage VDD, and a second terminal connected to the gate of the twenty-second transistor T22. The fifth resistor R5 has a first terminal connected to the second terminal of the twenty-third transistor T23 and a second terminal for receiving the ground voltage VGND. The second capacitor C2 has a first electrode connected to the second terminal of the twentieth transistor T20 and a second electrode connected to the gate of the twenty-second transistor T22. The twenty-fourth transistor T24 has a gate connected to the gate of the twenty-second transistor T22, a first terminal connected to the output node NO at which the pixel power supply voltage ELVDD is output, and a second terminal for receiving the ground voltage VGND. Further, in some embodiments, the twenty-first transistor T21 may be implemented as, but is not limited to, an NMOS transistor, and the twentieth, twenty-second, twenty-third and twenty-fourth transistors T20, T22, T23 and T24 may be implemented as, but are not limited to, PMOS transistors.

Figure 14:
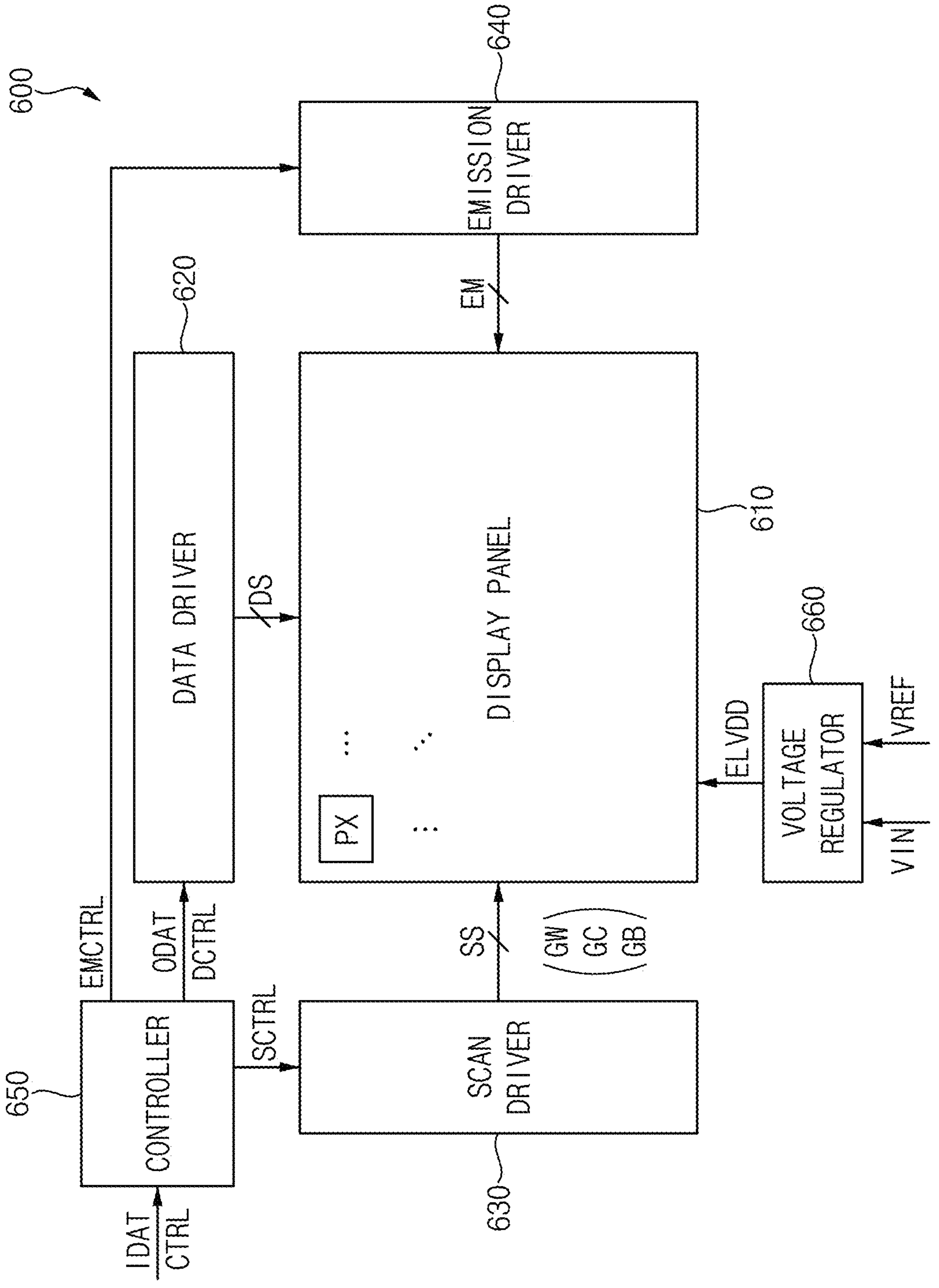
FIG. 14 is a block diagram illustrating a display device according to an embodiment of the present disclosure.

FIG. 14 is a block diagram illustrating a display device according to an embodiment of the present disclosure.

Referring to FIG. 14, a display device 600 according to the illustrated embodiment may include a display panel 610 that includes a plurality of pixels PX, a data driver 620 that provides data signals DS to the plurality of pixels PX, a scan driver 630 that provides scan signals SS (e.g., writing signals GW, compensation signals GC and bypass signals GB) to the plurality of pixels PX, an emission driver 640 that provides emission signals EM to the plurality of pixels PX, a controller 650 that controls the data driver 620, the scan driver 630 and the emission driver 640, and a voltage regulator 660 that supplies a pixel power supply voltage ELVDD to the plurality of pixels PX.

Figure 15:
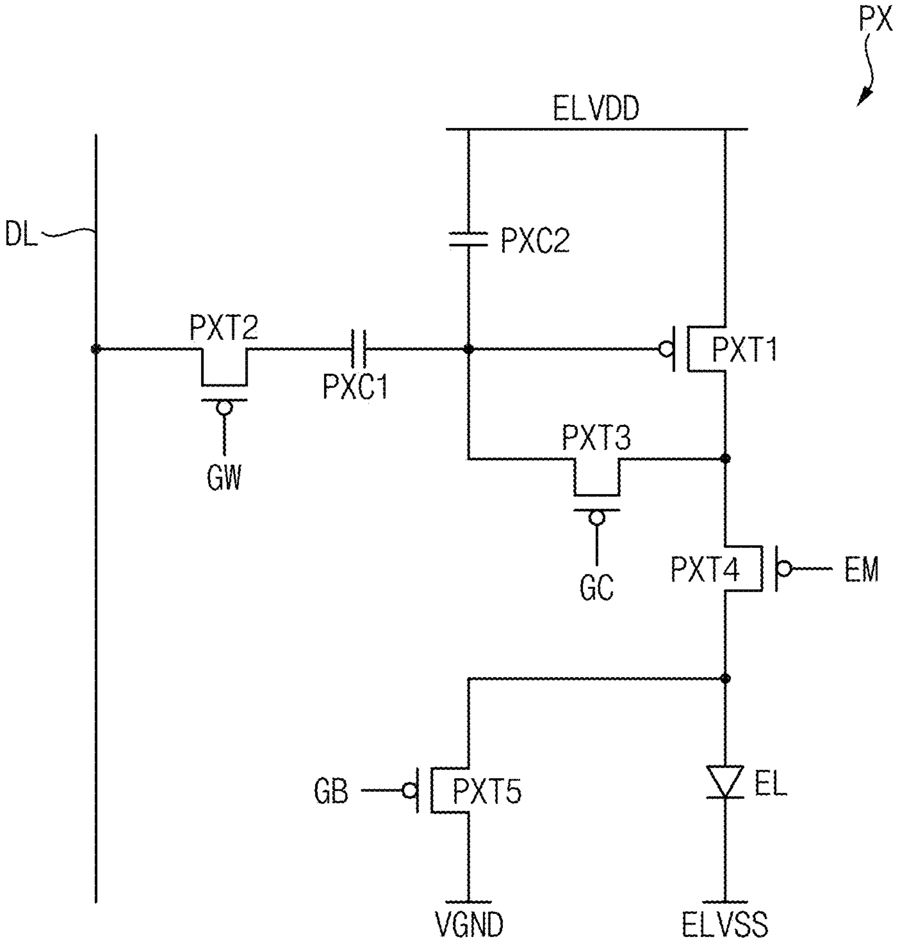
FIG. 15 is a circuit diagram of a pixel included in a display device according to an embodiment of the present disclosure.

The display panel 610 may include data lines, scan lines, emission lines, and the plurality of pixels PX connected thereto. In some embodiments, as illustrated in FIG. 15, each pixel PX may include a first transistor PXT1, a second transistor PXT2, a third transistor PXT3, a fourth transistor PXT4, a fifth transistor PXT5, a first capacitor PXC1, a second capacitor PXC2 and a light emitting element EL.

The first transistor PXT1 may include a gate connected to the first and second capacitors PXC1 and PXC2, a first terminal for receiving the pixel power supply voltage ELVDD, and a second terminal. The second transistor PXT2 may include a gate for receiving the writing signal GW, a first terminal connected to the data line DL, and a second terminal connected to the first capacitor PXC1. The third transistor PXT3 may include a gate for receiving the compensation signal GC, a first terminal connected to the second terminal of the first transistor PXT1, and a second terminal connected to the gate of the first transistor PXT1. The fourth transistor PXT4 may include a gate for receiving the emission signal EM, a first terminal connected to the second terminal of the first transistor PXT1, and a second terminal connected to the light emitting element EL. The fifth transistor PXT5 may include a gate for receiving the bypass signal GB, a first terminal connected to the light emitting element EL, and a second terminal for receiving a ground voltage VGND. Further, the first capacitor PXC1 may include a first electrode connected to the second terminal of the second transistor PXT2 and a second electrode connected to the gate of the first transistor PXT1. The second capacitor PXC2 may include a first electrode for receiving the pixel power supply voltage ELVDD and a second electrode connected to the gate of the first transistor PXT1. The light emitting element EL may include an anode connected to the second electrode of the fourth transistor PXT4 and the first terminal of the fifth transistor PXT5 and a cathode for receiving a low power supply voltage ELVSS. In some embodiments, the light emitting element EL may be, but is not limited to, an organic light emitting diode OLED. In other embodiments, the light emitting element EL may be a micro-light emitting diode, a nano light emitting diode (NED), a quantum dot (QD) light emitting diode, an inorganic light emitting diode, or any other suitable light emitting element.

The data driver 620 may generate the data signals DS based on output image data ODAT and a data control signal DCTRL received from the controller 650, and the data driver 620 may provide the data signals DS to the plurality of pixels PX through the data lines. In some embodiments, the data control signal DCTRL may include, but is not limited to, an output data enable signal, a horizontal start signal, and a load signal. Further, in some embodiments, the data driver 620 and the controller 650 may be implemented as a single integrated circuit, and the single integrated circuit may be referred to as a timing controller embedded data driver (TED). In other embodiments, the data driver 620 and the controller 650 may be implemented as separate integrated circuits.

The scan driver 630 may generate the scan signals SS based on a scan control signal SCTRL received from the controller 650, and the scan driver 630 may sequentially provide the scan signals SS to the plurality of pixels PX through the scan lines on a row-by-row basis. In some embodiments, the scan control signal SCTRL may include, but is not limited to, a scan start signal, a scan clock signal, etc. Further, the scan signal SS provided to each pixel PX may include, but is not limited to, the writing signal GW, the compensation signal GC, and the bypass signal GB. In some embodiments, the scan driver 630 may be integrated or formed in a peripheral region of the display panel 610. In other embodiments, the scan driver 630 may be integrated or formed in a display region of the display panel 610. In still other embodiments, the scan driver 630 may be implemented as one or more integrated circuits.

The emission driver 640 may generate the emission signals EM based on an emission control signal EMCTRL received from the controller 650, and the emission driver 640 may sequentially provide the emission signals EM to the plurality of pixels PX through the emission lines on a row-by-row basis. In some embodiments, the emission control signal EMCTRL may include, but is not limited to, an emission start signal, an emission clock signal, etc. Further, in some embodiments, the emission driver 640 may be integrated or formed in the peripheral region of the display panel 610. In other embodiments, the emission driver 640 may be integrated or formed in the display region of the display panel 610. In other embodiments, the emission driver 640 may be implemented as one or more integrated circuits.

The controller 650 (e.g., a timing controller) may receive input image data IDAT and a control signal CTRL from an external host processor, e.g., a graphics processing unit (GPU), an application processor (AP) or a graphics card. In some embodiments, the control signal CTRL may include, but is not limited to, a vertical synchronization signal, a horizontal synchronization signal, an input data enable signal, and a master clock signal. The controller 650 may generate the output image data ODAT, the data control signal DCTRL, the scan control signal SCTRL and the emission control signal EMCTRL based on the input image data IDAT and the control signal CTRL. The controller 650 may control the data driver 620 by providing the output image data ODAT and the data control signal DCTRL to the data driver 620, may control the scan driver 630 by providing the scan control signal SCTRL to the scan driver 630, and may control the emission driver 640 by providing the light emission control signal EMCTRL to the emission driver 640.

The voltage regulator 660 may supply the pixel power supply voltage ELVDD to the plurality of pixels PX of the display panel 610 based on an input voltage VIN and a reference voltage VREF. In some embodiments, the input voltage VIN may be provided from an external device (e.g., a battery), or may be generated by a power management circuit (e.g., a power management integrated circuit (PMIC)) based on a voltage provided from the external device. Further, in some embodiments, the reference voltage VREF may be, but is not limited to, a bandgap reference voltage that is a substantially constant voltage regardless of a power supply variation, a temperature change, or a circuit loading, etc. The voltage regulator 660 may be a voltage regulator 100 of FIG. 1, a voltage regulator 400 of FIG. 12, or the like. In some embodiments, the voltage regulator 660 may be integrated or formed in the peripheral region of the display panel 610. In other embodiments, the voltage regulator 660 may be integrated or formed in the display region of the display panel 610. In still other embodiments, the voltage regulator 660 may be included in the data driver 620, the controller 650 or the power management circuit.

In the display device 600 according to an embodiment, the voltage regulator 660 may include a variable phase compensating circuit that adjusts an amplifier output voltage according to a load current, and a source follower buffer disposed between an error amplifier and a pass transistor. Accordingly, the voltage regulator 660 may have a phase margin greater than a reference phase margin in the entire load current range from a minimum load current to a maximum load current, and the voltage regulator 660 may stably operate even if the load current changes.

Figure 16:
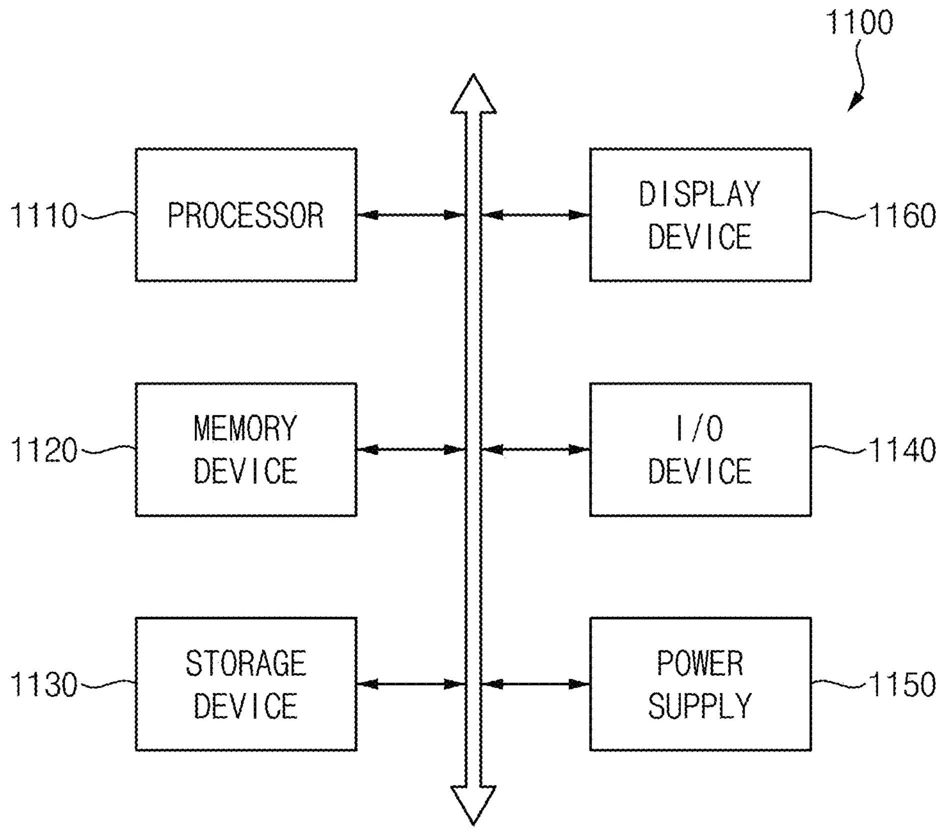
FIG. 16 is a block diagram illustrating an electronic device an embodiment of the present disclosure including a display device.

FIG. 16 is a block diagram illustrating an electronic device including a display device according to an embodiment of the present disclosure.

Referring to FIG. 16, an electronic device 1100 may include a processor 1110, a memory device 1120, a storage device 1130, an input/output (I/O) device 1140, a power supply 1150, and a display device 1160. The electronic device 1100 may further include a plurality of ports for communicating with a video card, a sound card, a memory card, a universal serial bus (USB) device, other electric devices, etc.

The processor 1110 may perform various computing functions or tasks. The processor 1110 may be an application processor (AP), a micro processor, a central processing unit (CPU), etc. The processor 1110 may be coupled to other components via an address bus, a control bus, a data bus, etc. Further, in some embodiments, the processor 1110 may be further coupled to an extended bus such as a peripheral component interconnection (PCI) bus.

The memory device 1120 may store data for operations of the electronic device 1100. For example, the memory device 1120 may include at least one non-volatile memory device such as an erasable programmable read-only memory (EPROM) device, an electrically erasable programmable read-only memory (EEPROM) device, a flash memory device, a phase change random access memory (PRAM) device, a resistance random access memory (RRAM) device, a nano floating gate memory (NFGM) device, a polymer random access memory (PoRAM) device, a magnetic random access memory (MRAM) device, a ferroelectric random access memory (FRAM) device, etc., and/or at least one volatile memory device such as a dynamic random access memory (DRAM) device, a static random access memory (SRAM) device, a mobile dynamic random access memory (mobile DRAM) device, etc.

The storage device 1130 may be a solid-state drive (SSD) device, a hard disk drive (HDD) device, a CD-ROM device, etc. The I/O device 1140 may be an input device such as a keyboard, a keypad, a mouse, a touch screen, etc., and an output device such as a printer, a speaker, etc. The power supply 1150 may supply power for operations of the electronic device 1100. The display device 1160 may be coupled to other components through the buses or other communication links.

In the display device 1160, a voltage regulator may include a variable phase compensating circuit that adjusts an amplifier output voltage according to a load current, and a source follower buffer disposed between an error amplifier and a pass transistor. Accordingly, the voltage regulator may have a phase margin greater than a reference phase margin throughout the entire load current range from a minimum load current to a maximum load current, and the voltage regulator may stably operate even if the load current changes.

The concepts disclosed herein may be applied any electronic device 1100 including the display device 1160. For example, the concepts disclosed herein may be applied to a mobile phone, a smart phone, a tablet computer, a virtual reality (VR) device, a television (TV) (e.g., a digital TV, a 3D TV, etc.) a wearable electronic device, a personal computer (PC), a home appliance, a laptop computer, a personal digital assistant (PDA), a portable multimedia player (PMP), a digital camera, a music player, a portable game console, a navigation device, etc.

The foregoing illustrates some specific embodiments but is not to be construed as limiting to those specific embodiments. Although a few embodiments have been described, those skilled in the art will readily appreciate that many modifications of the embodiments are possible without materially departing from the novel teachings and advantages disclosed herein. Accordingly, all such modifications are intended to be included within the scope defined in the claims. Therefore, it is to be understood that the foregoing is illustrative of various embodiments and is not to be construed as limited to the specific embodiments disclosed, and that modifications to the disclosed embodiments, as well as other embodiments, are intended to be included within the scope of the appended claims.

What is claimed is:

1. A voltage regulator for outputting a pixel power supply voltage supplied to pixels of a display panel, the voltage regulator comprising:

a voltage divider configured to generate a feedback voltage by dividing the pixel power supply voltage;

an error amplifier configured to generate an amplifier output voltage by comparing a reference voltage and the feedback voltage;

a variable phase compensating circuit configured to adjust the amplifier output voltage according to a load current;

a source follower buffer configured to generate a control voltage by buffering the adjusted amplifier output voltage; and a pass transistor configured to output, as the pixel power supply voltage, an input voltage based on the control voltage.

2. The voltage regulator of claim 1, further comprising:

at least one compensation capacitor connected between the error amplifier and an output node at which the pixel power supply voltage is output.

3. The voltage regulator of claim 1, further comprising:

an output capacitor connected between an output node at which the pixel power supply voltage is output and a line for transferring a ground voltage.

4. The voltage regulator of claim 1, wherein the variable phase compensating circuit includes:

a first transistor including a gate connected to a gate of the pass transistor, a first terminal for receiving a power supply voltage, and a second terminal;

a first resistor including a first terminal and a second terminal, the first terminal being connected to the second terminal of the first transistor; and a first capacitor including a first electrode connected to the second terminal of the first resistor and a second electrode connected to an amplifier output node at which the amplifier output voltage is output.

5. The voltage regulator of claim 1, wherein the source follower buffer includes:

a second transistor including a gate connected to an amplifier output node at which the amplifier output voltage is output, a first terminal connected to a gate of the pass transistor, and a second terminal for receiving a ground voltage; and a variable current source connected between a line for transferring a power supply voltage and the gate of the pass transistor.

6. The voltage regulator of claim 1, wherein the source follower buffer includes:

a second transistor including a gate connected to an amplifier output node at which the amplifier output voltage is output, a first terminal connected to a gate of the pass transistor, and a second terminal for receiving a ground voltage;

a first current source connected between a line for transferring a power supply voltage and the gate of the pass transistor;

a third transistor including a gate connected to the gate of the pass transistor, a first terminal for receiving the power supply voltage, and a second terminal;

a fourth transistor including a gate connected to the second terminal of the third transistor, a first terminal connected to the second terminal of the third transistor, and a second terminal for receiving the ground voltage;

a fifth transistor including a gate connected to the gate of the fourth transistor, a first terminal, and a second terminal;

a second resistor including a first terminal connected to the second terminal of the fifth transistor, and a second terminal for receiving the ground voltage;

a sixth transistor including a gate connected to the first terminal of the fifth transistor, a first terminal for receiving the power supply voltage, and a second terminal connected to the first terminal of the fifth transistor; and a seventh transistor including a gate connected to the gate of the sixth transistor, a first terminal for receiving the power supply voltage, and a second terminal connected to the gate of the pass transistor.

7. The voltage regulator of claim 1, wherein the voltage divider includes:

a third resistor including a first terminal connected to an output node at which the pixel power supply voltage is output, and a second terminal connected to a feedback node at which the feedback voltage is output; and a fourth resistor including a first terminal connected to the feedback node, and a second terminal for receiving a ground voltage.

8. The voltage regulator of claim 1, wherein the error amplifier includes:

an eighth transistor including a gate for receiving the reference voltage, a first terminal, and a second terminal;

a ninth transistor including a gate for receiving the feedback voltage, a first terminal, and a second terminal;

a second current source connected between a line for transferring a power supply voltage and the first terminals of the eighth and ninth transistors;

a tenth transistor including a gate connected to the second terminal of the eighth transistor, a first terminal connected to the second terminal of the eighth transistor, and a second terminal for receiving a ground voltage;

an eleventh transistor including a gate connected to the second terminal of the ninth transistor, a first terminal connected to the second terminal of the ninth transistor, and a second terminal for receiving the ground voltage;

a twelfth transistor including a gate connected to the gate of the tenth transistor, a first terminal, and a second terminal for receiving the ground voltage;

a thirteenth transistor including a gate connected to the gate of the eleventh transistor, a first terminal, and a second terminal for receiving the ground voltage;

a fourteenth transistor including a gate for receiving a direct current (DC) voltage, a first terminal, and a second terminal connected to the first terminal of the twelfth transistor;

a fifteenth transistor including a gate for receiving the DC voltage, a first terminal connected to an amplifier output node at which the amplifier output voltage is output, and a second terminal connected to the first terminal of the thirteenth transistor;

a sixteenth transistor including a gate connected to the first terminal of the fourteenth transistor, a first terminal, and a second terminal connected to the first terminal of the fourteenth transistor;

a seventeenth transistor including a gate connected to the gate of the sixteenth transistor, a first terminal, and a second terminal connected to the amplifier output node;

an eighteenth transistor including a gate connected to the first terminal of the sixteenth transistor, a first terminal for receiving the power supply voltage, and a second terminal connected to the first terminal of the sixteenth transistor; and a nineteenth transistor including a gate connected to the gate of the eighteenth transistor, a first terminal for receiving the power supply voltage, and a second terminal connected to the first terminal of the seventeenth transistor.

9. The voltage regulator of claim 8, further comprising:

a first compensation capacitor including a first electrode connected to an output node at which the pixel power supply voltage is output, and a second electrode connected to the second terminal of the fifteenth transistor.

10. The voltage regulator of claim 8, further comprising:

a second compensation capacitor including a first electrode connected to an output node at which the pixel power supply voltage is output, and a second electrode connected to the gates of the tenth and twelfth transistors.

11. The voltage regulator of claim 8, further comprising:

a third compensation capacitor including a first electrode connected to an output node at which the pixel power supply voltage is output, and a second electrode connected to the gate of the ninth transistor.

12. The voltage regulator of claim 1, further comprising:

a transient booster configured to adjust the pixel power supply voltage in a transient state in which the load current changes.

13. The voltage regulator of claim 12, wherein the transient booster includes:

a twentieth transistor including a gate connected to a gate of the pass transistor, a first terminal for receiving a power supply voltage, and a second terminal;

a third current source connected between the second terminal of the twentieth transistor and a line for transferring a ground voltage;

a twenty-first transistor including a gate connected to the gate of the pass transistor, a first terminal for receiving the power supply voltage, and a second terminal;

a twenty-second transistor including a gate, a first terminal connected to the second terminal of the twenty-first transistor, and a second terminal for receiving the ground voltage;

a twenty-third transistor including a gate connected to the second terminal of the twenty-first transistor, a first terminal for receiving the power supply voltage, and a second terminal connected to the gate of the twenty-second transistor;

a fifth resistor including a first terminal connected to the second terminal of the twenty-third transistor, and a second terminal for receiving the ground voltage;

a second capacitor including a first electrode connected to the second terminal of the twentieth transistor, and a second electrode connected to the gate of the twenty-second transistor; and a twenty-fourth transistor including a gate connected to the gate of the twenty-second transistor, a first terminal connected to an output node at which the pixel power supply voltage is output, and a second terminal for receiving the ground voltage.

14. A voltage regulator for outputting a pixel power supply voltage supplied to pixels of a display panel, the voltage regulator comprising:

a voltage divider configured to generate a feedback voltage by dividing the pixel power supply voltage;

an error amplifier configured to generate an amplifier output voltage by comparing a reference voltage and the feedback voltage;

a first transistor including a gate connected to a gate of a pass transistor, a first terminal for receiving a power supply voltage, and a second terminal;

a first resistor including a first terminal connected to the second terminal of the first transistor, and a second terminal;

a first capacitor including a first electrode connected to the second terminal of the first resistor, and a second electrode connected to an amplifier output node at which the amplifier output voltage is output;

a second transistor including a gate connected to the amplifier output node, a first terminal connected to the gate of the pass transistor, and a second terminal for receiving a ground voltage;

a variable current source connected between a line for transferring the power supply voltage and the gate of the pass transistor; and the pass transistor including the gate connected to the gate of the first transistor and the first terminal of the second transistor, a first terminal for receiving an input voltage, and a second terminal connected to an output node at which the pixel power supply voltage is output.

15. The voltage regulator of claim 14, further comprising:

at least one compensation capacitor connected between the output node and the error amplifier.

16. The voltage regulator of claim 14, further comprising:
an output capacitor connected between the output node and a line for transferring the ground voltage.

17. A display device comprising:
a display panel including a plurality of pixels;
a data driver configured to provide data signals to the plurality of pixels;
a scan driver configured to provide scan signals to the plurality of pixels;
an emission driver configured to provide emission signals to the plurality of pixels;
a controller configured to control the data driver, the scan driver and the emission driver; and
a voltage regulator configured to supply a pixel power supply voltage to the plurality of pixels, the voltage regulator comprising:
a voltage divider configured to generate a feedback voltage by dividing the pixel power supply voltage;
an error amplifier configured to generate an amplifier output voltage by comparing a reference voltage and the feedback voltage;
a variable phase compensating circuit configured to adjust the amplifier output voltage according to a load current;
a source follower buffer configured to generate a control voltage by buffering the adjusted amplifier output voltage; and
a pass transistor configured to output, as the pixel power supply voltage, an input voltage based on the control voltage.

18. The display device of claim 17, wherein the variable phase compensating circuit includes:
a first transistor including a gate connected to a gate of the pass transistor, a first terminal for receiving a power supply voltage, and a second terminal;
a first resistor including a first terminal connected to the second terminal of the first transistor, and a second terminal; and
a first capacitor including a first electrode connected to the second terminal of the first resistor, and a second electrode connected to an amplifier output node at which the amplifier output voltage is output.

19. The display device of claim 17, wherein the source follower buffer includes:
a second transistor including a gate connected to an amplifier output node at which the amplifier output voltage is output, a first terminal connected to a gate of the pass transistor, and a second terminal for receiving a ground voltage; and
a variable current source connected between a line for transferring a power supply voltage and the gate of the pass transistor.

20. The display device of claim 17, wherein the source follower buffer includes:
a second transistor including a gate connected to an amplifier output node at which the amplifier output voltage is output, a first terminal connected to a gate of the pass transistor, and a second terminal for receiving a ground voltage;
a first current source connected between a line for transferring a power supply voltage and the gate of the pass transistor;
a third transistor including a gate connected to the gate of the pass transistor, a first terminal for receiving the power supply voltage, and a second terminal;
a fourth transistor including a gate connected to the second terminal of the third transistor, a first terminal connected to the second terminal of the third transistor, and a second terminal for receiving the ground voltage;
a fifth transistor including a gate connected to the gate of the fourth transistor, a first terminal, and a second terminal;
a second resistor including a first terminal connected to the second terminal of the fifth transistor, and a second terminal for receiving the ground voltage;
a sixth transistor including a gate connected to the first terminal of the fifth transistor, a first terminal for receiving the power supply voltage, and a second terminal connected to the first terminal of the fifth transistor, and
a seventh transistor including a gate connected to the gate of the sixth transistor, a first terminal for receiving the power supply voltage, and a second terminal connected to the gate of the pass transistor.

* * * * *